United States Patent

Brewer et al.

[11] Patent Number: 6,014,691
[45] Date of Patent: Jan. 11, 2000

[54] DISTRIBUTED DATA COLLECTION SYSTEM FOR REMOTE PHOTOGRAPHIC PROCESSING EQUIPMENT

[75] Inventors: Edward B. Brewer; Thomas L. Bono, both of Allentown; Benjamin Duran Smith, Green Lane; Richard B. Brewer, Schnecksville, all of Pa.

[73] Assignee: BEF Corporation, Allentown, Pa.

[21] Appl. No.: 08/764,097

[22] Filed: Dec. 6, 1996

[51] Int. Cl.[7] .............................. G06F 13/38; G06F 15/17
[52] U.S. Cl. ........................................... 709/217; 709/246
[58] Field of Search ........................ 395/200.47, 200.76, 395/200.54, 200.68; 340/870.01, 870.02, 870.03; 709/217, 246, 224, 238

[56] References Cited

U.S. PATENT DOCUMENTS

| | | | |
|---|---|---|---|
| 4,232,295 | 11/1980 | McConnell | 340/825.25 |
| 4,713,837 | 12/1987 | Gordon | 379/106.07 |
| 4,751,648 | 6/1988 | Sears, III et al. | 702/6 |
| 5,475,742 | 12/1995 | Gilbert | 379/106.01 |
| 5,491,473 | 2/1996 | Gilbert | 340/870.01 |
| 5,608,874 | 3/1997 | Ogawa et al. | 395/200.76 |
| 5,715,397 | 2/1998 | Ogawa et al. | 395/200.76 |

*Primary Examiner*—Mark H. Rinehart
*Attorney, Agent, or Firm*—Sanford J. Piltch

[57] ABSTRACT

A remote data collection system for use with a photo-minilab includes an on-site data collector and a host computer. The on-site data collector controls collection of data and information regarding operation of the apparatus and communicates with the host computer to download data from the on-site data collector to be stored into pre-designated data tables. The on-site data collector allows for manual entry of data and control commands via keypads and accesses on-site monitoring devices by program control to gather production data and quality control information.

14 Claims, 25 Drawing Sheets

INITIALIZATION/INTERRUPT SEQUENCE

*Fig.4A*

| Table: PRODUCTION DATA TABLE (APS) | |
|---|---|
| Fields: | |
| PRICING UNIT ID | Text |
| SORTNO | Number |
| FILM TYPE | Number |
| NO OF EXPOSURES | Number |
| NO OF ROLLS | Number |
| (1) PRINT SIZE CHANNEL | Number |
| (1) NO OF PRINTS | Number |
| ⋮ | ⋮ |
| (8) PRINT SIZE CHANNEL | Number |
| (8) NO OF PRINTS | Number |
| FID (FILM) | Number |
| CID (CARTRIDGE) | Number |
| DX CODE | Text |
| CAMERA SERIAL NO | Number |
| APS | Number |
| LOT NO | Number |
| DP ENVELOPE NO | Text |
| STORE CODE | Text |

*Fig.14-1*

| Table: ACCT INFO | |
|---|---|
| Fields: | |
| ACCT_NAME | Text |
| ADDRESS1 | Text |
| ADDRESS2 | Text |
| CITY | Text |
| STATE | Text |
| ZIP | Text |
| PHONE | Text |
| FAX | Text |

(Related to REGIONAL INFO TABLE)

*Fig.14-2*

| Table: DIALNOW TABLE | |
|---|---|
| Fields: | |
| STORENO | Text |
| DATANO | Text |
| FCHEM | Text |
| PCHEM | Text |
| CHEM | Text |
| FirstOfCSC | Text |
| PW | Number |
| TZOFFST | Number |
| MACHINENO | Number |
| RTS/CTS | Yes/No |

*Fig.14-3*

| Table: EVENT LOG TABLE | |
|---|---|
| Fields: | |
| Date | Date |
| StoreNo | Text |
| Type | Text |
| Event | Text |
| Comment | Text |
| READ | Yes/No |

*Fig.14-4*

| Table: FILE NAMES TABLE | |
|---|---|
| Fields: | |
| FILE_NAME | Text |
| FN_FIRST | Date |
| FN_LAST | Date |

*Fig. 14-5*

| Table: FILM CHANNEL DEFAULT TABLE | |
|---|---|
| Fields: | |
| FILM CHANNEL | Text |
| FILM TYPE | Text |

*Fig. 14-6*

| Table: FILM CHANNEL TABLE | |
|---|---|
| Fields: | |
| STORENO | Text |
| FILM CHANNEL | Text |
| FILM TYPE | Text |

(Related to PRODUCTION DATA TABLE)

*Fig. 14-7*

| Table: FILM SIZE LOOKUP TABLE | |
|---|---|
| Fields: | |
| FILM CHANNEL | Text |
| FILM TYPE | Text |
| FILM LENGTH | Number |

(Related to FILM CHANNEL TABLE)

*Fig. 14-8*

| Table: MACHINE LOOKUP TABLE | |
|---|---|
| Fields: | |
| MODEL | Text |
| MACHINENO | Number |
| NOTES | Memo |

(Related to STORE INFO TABLE)

*Fig. 14-9*

| Table: MESSAGE LOOKUP TABLE | |
|---|---|
| Fields: | |
| MCODE | Number |
| MESSAGE | Text |

(Related to MESSAGE TABLE)

*Fig. 14-10*

| Table: MESSAGE TABLE | |
|---|---|
| Fields: | |
| COUNTER | Number |
| STORENO | Text |
| MCODE | Number |
| DATE | Date |
| READ | Yes/No |

*Fig. 14-11*

| Table: PRINT CHANNEL DEFAULT TABLE | |
|---|---|
| Fields: | |
| PRINT CHANNEL | Text |
| PRINT SIZE | Text |

(Related to PRODUCTION DATA TABLE)

*Fig. 14-12*

| Table: PRINT CHANNEL TABLE | |
|---|---|
| Fields: | |
| STORENO | Text |
| PRINT CHANNEL | Text |
| PRINT SIZE | Text |

*Fig. 14-13*

| Table: PRINT SIZE LOOKUP TABLE | |
|---|---|
| Fields: | |
| PRINT SIZE | Text |
| AREA | DecimalNB |
| LENGTH | DecimalNB |
| WIDTH | DecimalNB |

(Related to PRINT CHANNEL TABLE)

*Fig.14−14*

| Table: PROCESS DATA TABLE | |
|---|---|
| Fields: | |
| PROCESS | Text |
| MFG | Text |
| A_LD | DecimalNB |
| A_HDLD | DecimalNB |
| A_DMIN | DecimalNB |
| A_DMAX | DecimalNB |
| C_LD | DecimalNB |
| C_HDLD | DecimalNB |
| C_DMIN | DecimalNB |
| C_DMAX | DecimalNB |
| CHEM | Text |

*Fig.14−15*

| Table: REGIONAL INFO TABLE | |
|---|---|
| Fields: | |
| REGION | Text |
| ACCT_NAME | Text |
| COORDINATOR | Text |
| ADDRESS1 | Text |
| ADDRESS2 | Text |
| CITY | Text |
| STATE | Text |
| ZIP | Text |
| PHONENO | Text |
| FAXNO | Text |
| DATANO | Text |

(Related to STORE INFO TABLE)

*Fig. 14-16*

| Table: SETUP TABLE | |
|---|---|
| Fields: | |
| COMPORT | Number |
| BAUDRATE | Text |
| FIRSTWEEKDAY | Text |
| DIALTIME | Date |
| TRIES | Number |
| BLOCK_TRIES | Number |
| INIT_STRING | Text |
| CONNECTDELAY | Number |
| SEND | Number |
| DISPLAY | Text |
| DB_MONTHS | Number |
| DB_DAYS | Number |
| FISCAL_YEAR | Date |
| DATA_PATH | Text |
| SETUP_PATH | Text |
| QC_PATH | Text |
| CURRENT_MDB | Text |

*Fig. 14-17*

| Table: STORE INFO TABLE | |
|---|---|
| Fields: | |
| STORENO | Text |
| REGION | Text |
| ADDRESS1 | Text |
| ADDRESS2 | Text |
| CITY | Text |
| STATE | Text |
| ZIP | Text |
| CONTACT | Text |
| PHONENO | Text |
| DATANO | Text |
| FAXNO | Text |
| WKSTART | Number |
| STSTART | Number |
| SNSTART | Number |
| TZOFFST | Number |
| ONLINE | Yes/No |
| FCHEM | Text |
| PCHEM | Text |
| FMOD | Text |
| PMOD | Text |
| PW | Number |
| RTS/CTS | Yes/No |

(Related to EVENT LOG, MESSAGE, PRINT CHANNEL, FILM CHANNEL, PRODUCTION DATA, AIM DATA TABLES)

*Fig. 14-18*

| Table: SUPPORT FILES TABLE |
|---|
| Fields: |
|     MDB_NAME    Text |
|     TABLE_NAME    Text |

*Fig. 15-1*

| Table: AIM DATA TABLE | |
|---|---|
| Fields: | |
| STORENO | Text |
| READTIME | Date |
| CSC | Text |
| PROCESS | Text |
| DMXBY | DecimalNB |
| DMXRG | DecimalNB |
| LDR | DecimalNB |
| LDG | DecimalNB |
| LDB | DecimalNB |
| HDLR | DecimalNB |
| HDLG | DecimalNB |
| HDLB | DecimalNB |
| DNR | DecimalNB |
| DNG | DecimalNB |
| DNB | DecimalNB |
| DXR | DecimalNB |
| DXB | DecimalNB |
| DXG | DecimalNB |
| YB | DecimalNB |

(Related to REFERENCE STRIP, CORRECTION FACTOR, CONTROL STRIP TABLES)

*Fig.15-2*

| Table: REFERENCE STRIP TABLE | |
|---|---|
| Fields: | |
| STORENO | Text |
| READTIME | Date |
| CSC | Text |
| PROCESS | Text |
| COMMENTS | Number |
| DNR | DecimalNB |
| DNG | DecimalNB |
| DNB | DecimalNB |
| LDR | DecimalNB |
| LDG | DecimalNB |
| LDB | DecimalNB |
| HDR | DecimalNB |
| HDG | DecimalNB |
| HDB | DecimalNB |
| DXR | DecimalNB |
| DXG | DecimalNB |
| DXB | DecimalNB |
| YB | DecimalNB |

*Fig.15-3*

| Table: CONTROL STRIP TABLE | |
|---|---|
| Fields: | |
| STORENO | Text |
| READTIME | Date |
| CSC | Text |
| AIMTIME | Date |
| PROCESS | Text |
| COMMENTS | Number |
| DNR | DecimalNB |
| DNG | DecimalNB |
| DNB | DecimalNB |
| LDR | DecimalNB |
| LDG | DecimalNB |
| LDB | DecimalNB |
| HDR | DecimalNB |
| HDG | DecimalNB |
| HDB | DecimalNB |
| DXR | DecimalNB |
| DXG | DecimalNB |
| DXB | DecimalNB |
| YB | DecimalNB |

*Fig. 15-4*

| Table: CORRECTION FACTOR TABLE | |
|---|---|
| Fields: | |
| STORENO | Text |
| READTIME | Date |
| CSC | Text |
| PROCESS | Text |
| DNR | DecimalNB |
| DNG | DecimalNB |
| DNB | DecimalNB |
| LDR | DecimalNB |
| LDG | DecimalNB |
| LDB | DecimalNB |
| HDR | DecimalNB |
| HDG | DecimalNB |
| HDB | DecimalNB |
| DXR | DecimalNB |
| DXG | DecimalNB |
| DXB | DecimalNB |
| YB | DecimalNB |

*Fig. 16*

| Table: PRODUCTION DATA TABLE | |
|---|---|
| Fields: | |
| STORENO | Text |
| DATE/TIME | Date |
| PRINT CHANNEL | Text |
| ORDERNO | Text |
| PRINT QTY | Number |
| FILM CHANNEL | Text |
| FILM QTY | Number |

DISTRIBUTED DATA COLLECTION SYSTEM FOR REMOTE PHOTOGRAPHIC PROCESSING EQUIPMENT

BACKGROUND OF THE INVENTION

The present invention relates to data collection systems, and more particularly, to a data collection system which collects and transmits data from a photo-minilab at a location distant from a central host computer to that computer where the received data is formatted allowing it to be stored in interrelated databases to be retrievable as viewed or printed data tables and charts.

In the photo-minilab industry a large number of stores may often be operated by a single entity. In order to make important business decisions, such as insuring the efficient allocation of resources and to monitor machine performance, it is necessary to obtain production data from each of the individual stores. Under present systems, however, the required data cannot be gathered instantaneously. As a result, the required data is not always timely available and is not where it can best be utilized to facilitate key business decisions.

In addition to being unable to obtain almost instantaneous information, the gathering of the data relating to the different parameters must be done separately. Data pertaining to production and quality control is currently obtained from different sources. This difficulty arises because it is necessary to communicate with not only a variety of different types of photo-minilab equipment, but also not all of the equipment is capable of generating performance reports. For example, photo quality may be measured by data received from a densitometer and production quantity may be measured by gathering data from a point-of-sale cash register.

Other industries have provided systems which are capable of monitoring a number of locations and relaying data to a central location. One such example is described in U.S. Pat. 4,940,976 [Gastouniotis, et al.] which discloses a system for the remote reading of a water meter. Water usage data is converted into electrical signals based upon the magnetic flux lines generated by the rotating magnets of the water meter. The water flow is continually totalled and transmitted to a remote receiver which then sends the information to a central location.

Although Gastouniotis, et al. discloses a system for remote data collection, it is not adaptable to the photo-minilab industry. According to Gastouniotis, et al., only one parameter, magnetic flux, can be monitored by the remote system. As a consequence only one type of water meter can be read, and therefore, each different type of water meter will require a monitoring system capable of determining flow from that apparatus.

Yet another problem with present systems are the delays which result from the time required to process the data. As is well known in data processing, compiled data must be organized in order to present it in a meaningful manner. As a result, the end user, once having collected performance data from a number of photo-minilabs, must take hours to collate and chart the data. In addition, performance data reports may be presented in a variety of ways, e.g. pie charts, bar graphs or in tabular form. Present systems of collecting performance data fail to provide either instantaneous data collection or convenient and timely data processing.

Therefore, it is apparent that a new type of remote data collection system is needed. Accordingly, it is an object of the present invention to provide a data collection system which can monitor performance data of photo-minilab equipment and sample data instantaneously.

Another object of the present invention is to sample a data collection system which is capable of communicating with and receiving data from photo-minilab equipment of different manufacturers.

Yet another object of the present invention is to provide a data collection system which can monitor and receive data from a plurality of photo-minilabs.

Another object of the present invention is to provide a data collection system which can monitor a number of photo-minilabs which possess different equipment or the same equipment which is configured differently.

Yet another object of the present invention is to provide a data collection system which can receive data from a remote photo-minilab, store the data in an appropriate form in a database, and retrieve the data in a format selected by the user.

Additional objects, advantages, and other novel features of the invention will be set forth in part in the description that follows and in part will become apparent to those skilled in the art upon examination of the following or may be learned with the practice of the invention.

SUMMARY OF THE INVENTION

The data collection system of the present invention is comprised of a number of on-site data collection apparatus and a host computer system interconnected by communications channels. The on-site data collection apparatus includes a controller which assists in gathering a variety of performance data, while the host system includes a communications protocol which serves to download data from the on-site data collection apparatus, formatting and storing the data into an appropriate data table or tables, and retrieving the data in a manner as requested by the end-user.

The on-site data collection apparatus is located in proximity to the photo-minilab and monitors a variety of operating elements. Accordingly, at least one programmable and four serial communication ports are provided. The serial ports communicate with a densitometer, a printer, and a store computer. The programmable port allows for compatibility and communication with more complicated devices such as pricing units or other peripheral devices. Additional communication ports can be provided depending upon the number of devices present in the minilab. In addition, an internal modem is located on board the on site apparatus in order to download data to the host system.

The on-site data collection apparatus includes four memory chip locations. At least two chip locations are reserved for random access memory (RAM) and electronically erasable programmable read only memory (EEPROM) while the remaining chip locations are reserved for electronically programmable read only memory (EPROM). The RAM serves as the primary data storage memory while the EEPROM serves as a secondary memory recoverable in the event of power loss. The EPROM's store the command sequence which operate the data collection apparatus.

The apparatus also consists of a key pad for manual data entry and entry of control options. Located above the key pad is an LCD display for indicating status information such as the date and time and any system errors which occur during data collection. In addition, a real time clock assists in time coding data as it is stored into the memory.

As was mentioned above, the command sequence which controls the data collection apparatus is stored in the EPROM memory. The data collection apparatus contains a CPU and a device select encoder. As operation commences, the command sequence initializes the CPU, utilizing the real time clock, sets the correct time and initializes the data collection elements contained in the photo-minilab. After initialization the apparatus sits idle and displays the date, and time and message on the LCD.

Like most devices which feature a central processing unit, the data collection apparatus is interrupt driven. As it sits idle, it awaits an interrupt signal from either the densitometer, the real time clock, the printer port, the key pad or a modem. The interrupt signal is sent to the CPU and is processed based upon the priority level of each interrupt signal. The CPU executes the appropriate interrupt subroutine which sends a signal to the device select encoder instructing the device which sent the interrupt to transmit its data. The data from the device is stored sequentially in both the RAM and EEPROM tagged with the date and time when the data was collected.

The host computer system may be located at a central office and may be a PC which is capable of supporting at least Windows NT or Windows 95/98 and has an internal or attached modem. The PC contains a communications command sequence which allows a user to contact a selected photo-minilab location either on demand or at a pre-set time. Once the communications command sequence is activated, the selected store is contacted via modem and the data stored locally in the selected data collection apparatus is downloaded to the host computer system where the data is formatted for storing in data tables having pre-determined parameters.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

FIG. 4A illustrates the format of the production data transferred during the execution of the printer/processor sub-program shown in FIG. 4.

FIGS. 12-1 and 12-2 are program flow diagrams of the DIALNOW program.

FIGS. 13-1 and 13-2 are program flow diagrams of the AUTODIAL program.

FIGS. 14-1–14-18 illustrate the relational data tables which contain the setup information which comprises the Setup Database.

FIGS. 15-1–15-4 illustrate the relational data tables which contain quality control reference information which comprises the Quality Control Database.

FIG. 16 illustrates the structure of the Production Databases which contain the production data gathered from the data collection apparatus.

FIG. 17 is a diagram of the Host System Software tree menu structure.

FIG. 18 is a plan view of the front panel of the data collection apparatus.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
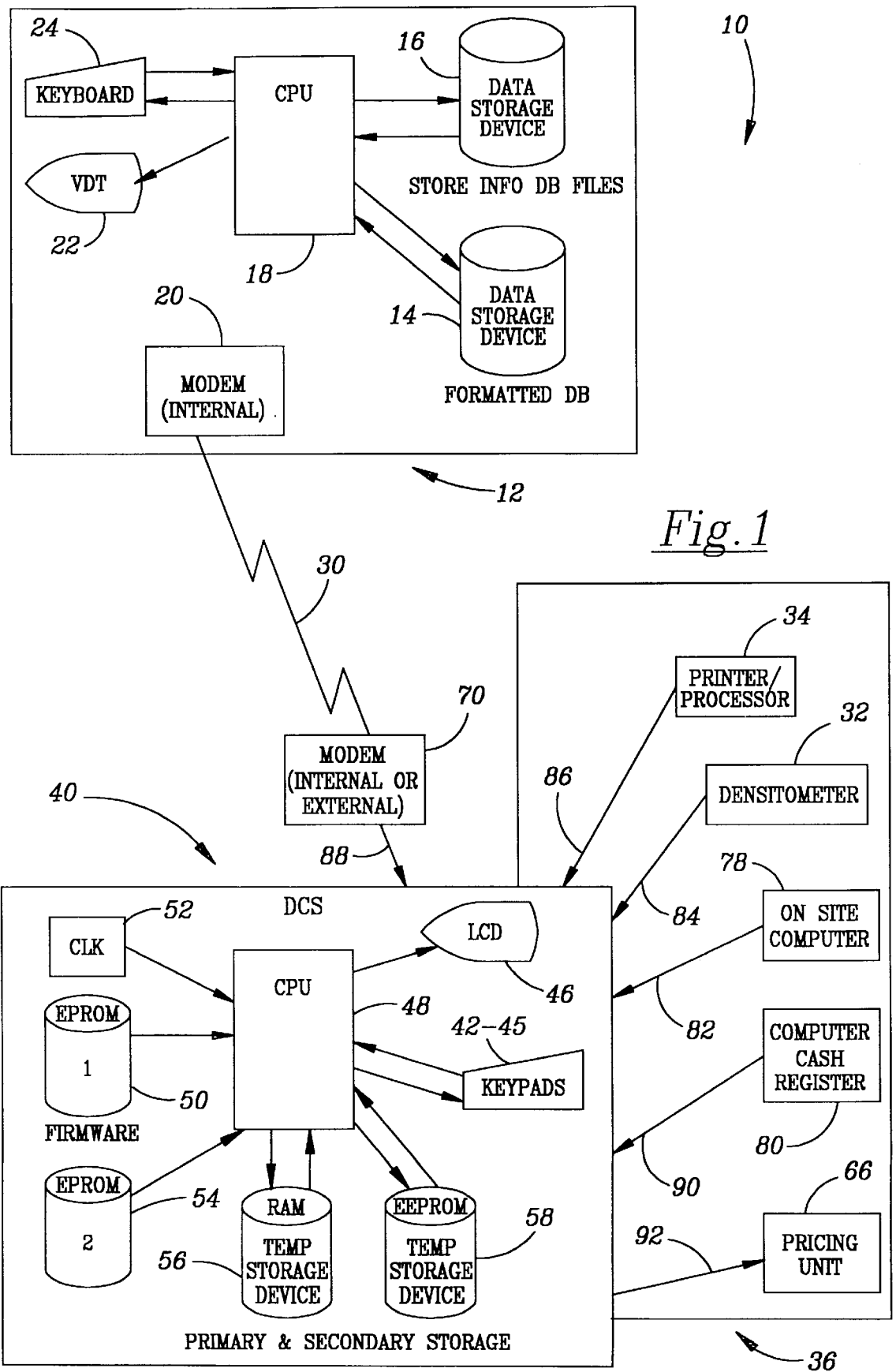
FIG. 1 is a block diagram of the network data collection system of the present invention.

Referring now to the drawings in detail, where like numerals refer to like parts or elements, there is shown in FIG. 1 an overall block diagram schematic of the data collection system 10 of the present invention. From FIG. 1, it can be seen that host system 12 is comprised of a digital computer with the standard components being a CPU 18, keyboard 24, memory devices 14 and 16 for storing downloaded data from various minilab locations, modem 20 and video display terminal (VDT) 22. In most cases, a PC which supports at least Windows NT or Windows 95/98 will be able to serve as the host system 12.

Host system 12 communicates with the data collection apparatus (DCS) 40 through communication line 30. Located at the minilab 36 and the host system 12 are modems 70 and 20, respectively. Modems 70 and 20 allow the host system 12 to communicate with the data collection apparatus 40 over the communication line 30 which may be either a telephone line or a data telecommunications line. There are other communication paths over which the host system 12 may communicate with the minilab 36, such as by an electronic mail system or a LAN.

Data collection apparatus 40 is preferably located adjacent to the photo-minilab 36 which contains various devices used in its daily operations. FIG. 1 shows only one possible configuration of equipment found in the minilab such as a densitometer 32, an on site computer 78, a printer/processor 34 and a computer cash register 80. By communicating with these devices a wide range of data can be gathered from the photo-minilab 36.

Figure 18:
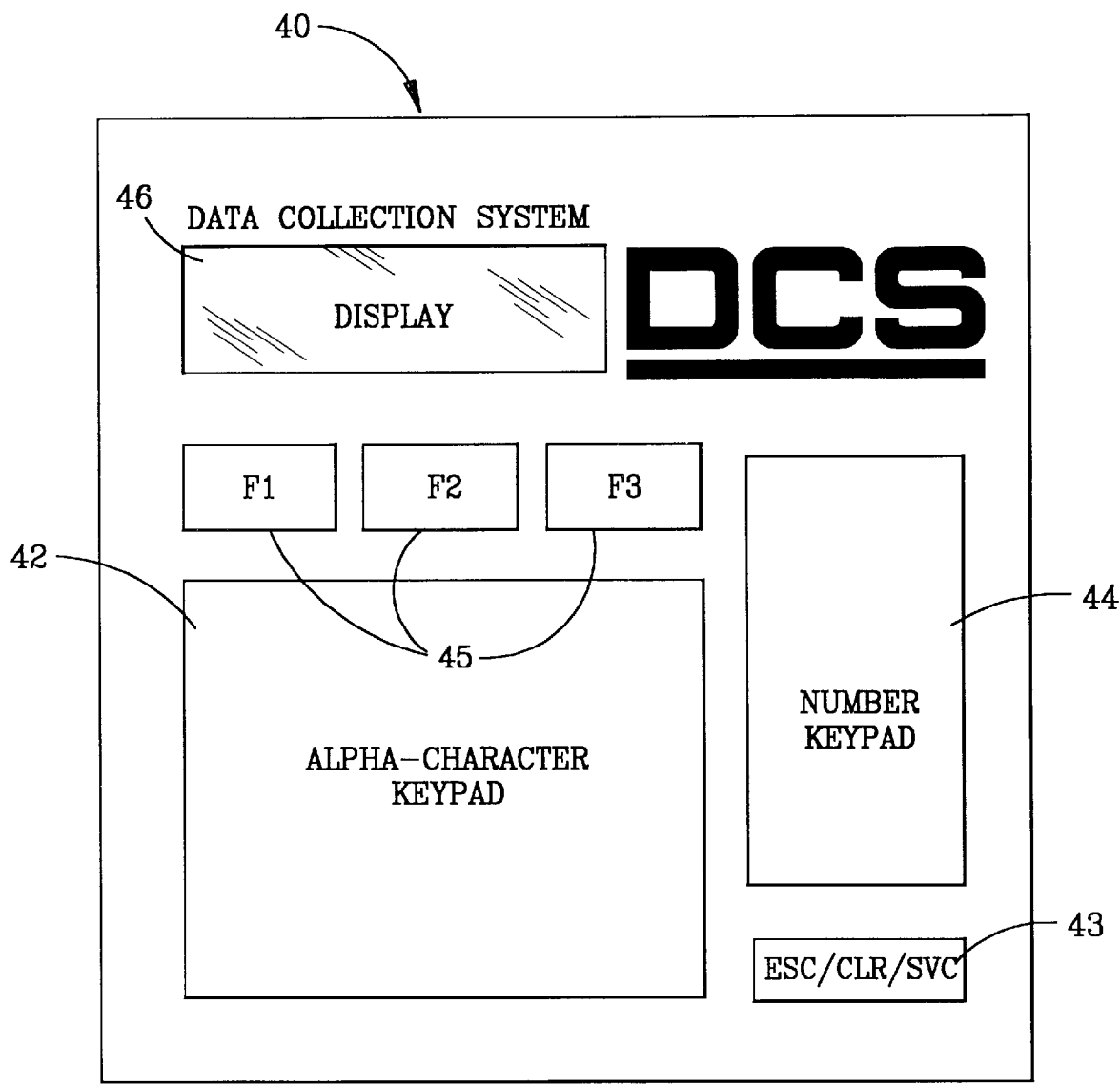

Data records are created from the monitored activity of the densitometer 32, the printer/processor 34, or activation of key pads 42–45 (FIG. 18). For example, production data is collected from the printer/processor 34. The production data can consist of print sizes, number or prints, film identification, number of rolls, number of orders, and the time during which the order was processed. Each printer/ processor order generates a production record. For quality control analysis, the DCS 40 collects reference and control data for film and paper from the densitometer 32 and permits manual entry of correction factors. The reference and control data are automatically transmitted to the DCS 40 from the densitometer 32. Control messages can also be sent to host system 12 by keying a pre-defined control key or sequence of keys located on key pads 42–45.

In addition, an optional pricing unit 66 can be made part of DCS 40. The pricing unit 66 receives formatted data relating to pricing, number of exposures, and the print channel of the printer/processor 34. In conventional film processing production information was limited to a single print channel for an entire roll of film. However, the newest photo system, known as Advanced Photo System (APS), has changed this. APS allows for a maximum of three print channels for each roll of film. For example, the pictures of a conventional roll of film will all be the same type requiring the printer/processor 34 to be set to a single channel. The APS system allows the roll of film to be programmed or customized for individual photographs according to the conditions set at the time the photo is taken. Thus, the printer/processor print channels will change when developing an APS photo.

Figure 4:
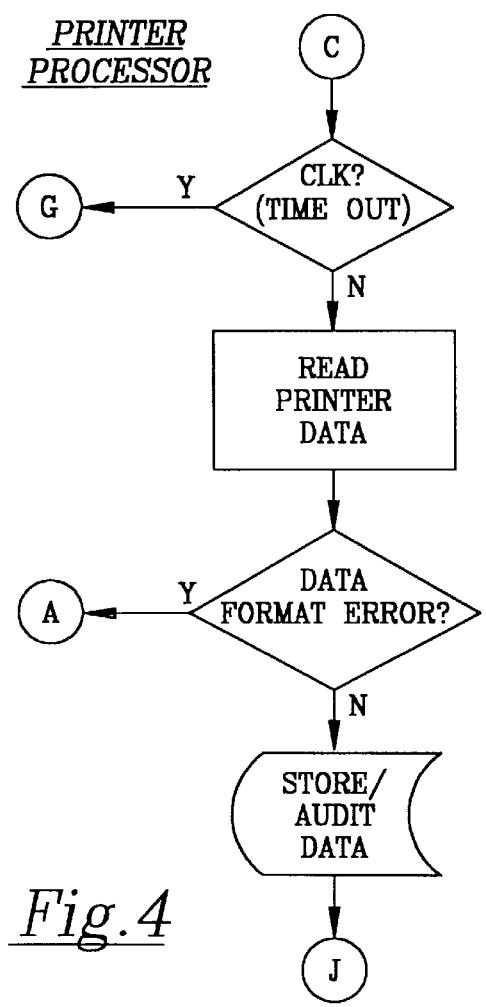
FIG. 4 is a program flow diagram of the printer/processor sub-program of the data collection apparatus interrupt sequence.

The existing equipment of the mini-lab 36 cannot communicate APS data without substantial modification. However, the DCS 40 can operate with the modified equipment and collect the additional APS information. For example, Fuji manufactures a printer/processor 34 capable of communicating APS data. FIG. 4A illustrates the format of the production data as transferred from the Fuji printer/ processor 34 to the DCS 40 during the execution of printer/ processor sub-program shown in FIG. 4 and discussed below. The data format is specific to the type of printer/ processor 34 actually used. Thus, a printer/processor manufactured by Canon will likely have a different format than shown in FIG. 4A. The DCS 40 is customized to accept data from different printer/processor models by making the appropriate machine number selection in the Setup Menu of the Host System Software shown in FIG. 17.

Figure 11:
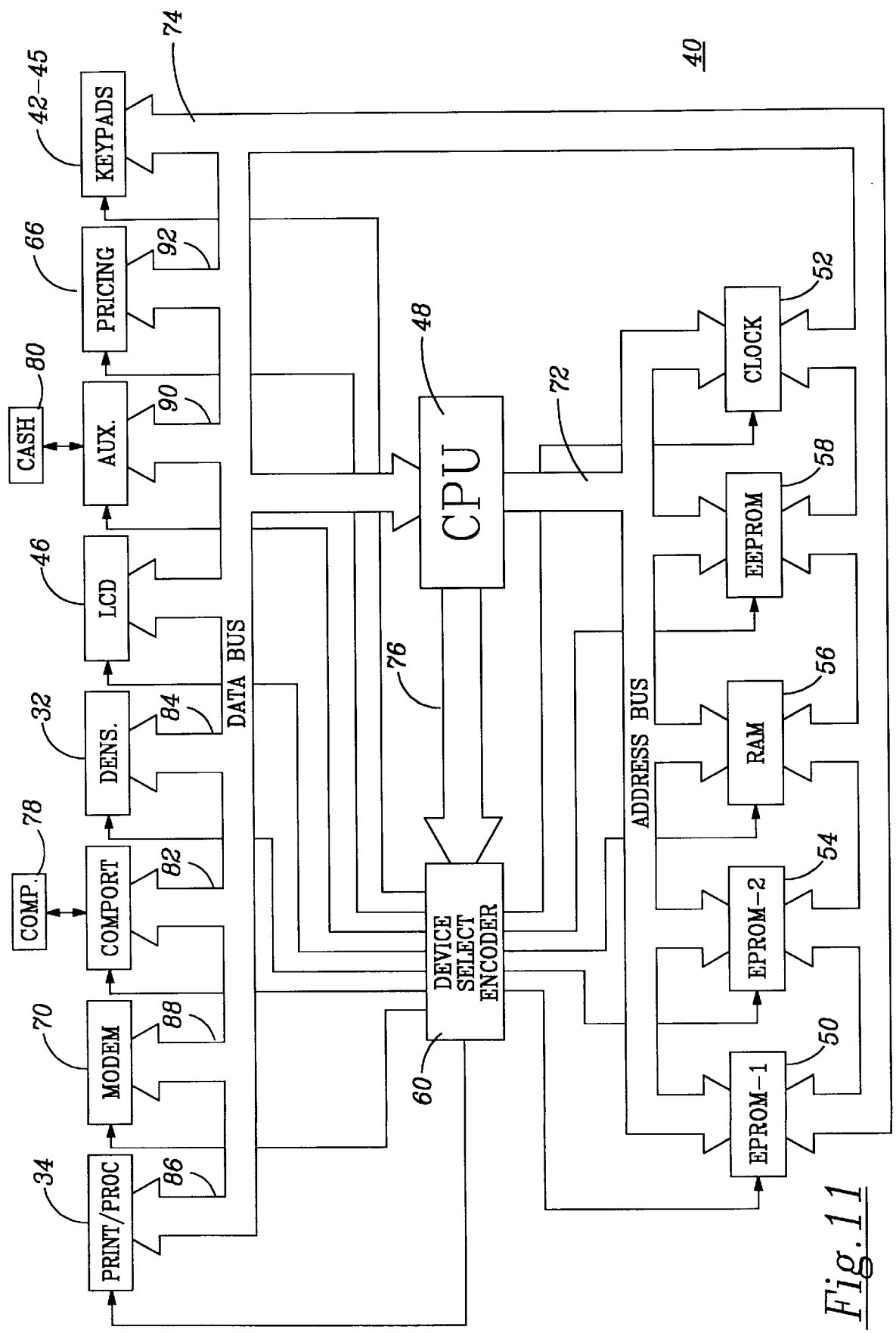
FIG. 11 is a circuit block diagram of the data collection apparatus.

With reference to FIG. 11, DCS 40 has a number of serial comports 82, 84, 86 and 88 for establishing communication lines with devices in the minilab 36 and with a distant computer via modem 70. A parallel port 90 is provided for communicating with devices which require parallel communication such as certain printer/processor models or a computer cash register or optional pricing unit 66. In addition, a programmable interface apparatus 92 is also provided which allows for communication with pricing unit 66. This variety of communication ports allows DCS 40 to be customized to collect data from minilabs with a variety of different equipment configurations.

The on-site DCS 40 is illustrated in further detail with reference to FIGS. 11 and 18. FIG. 18 shows a front view of the on-site DCS 40. Located on the front of the apparatus are several groupings of key switches which permit manual entry of data and control commands and which serve to perform such tasks as resetting the DCS 40. The various key switches are grouped into an alpha-character keypad 42, a numeric keypad 44, a control keypad 43, and a function keypad 45. The respective keypads 42–45 permit the manual entry of data and other functions which will be described in further detail below. Located above the key pads 42 is liquid crystal display (LCD) 46 which communicates status information such as the date, time, and any reference status or errors message which may occur during set up or data collection. The DCS 40 is powered by a single 5 VDC power adapter and, when idling, power consumption is approximately 5 W.

FIG. 11 is the circuit block diagram of the DCS 40 which comprises CPU 48, device select encoder 60 and a system bus. The system bus is comprised of an address bus 72, data bus 74 and a control bus 76. Permanent and temporary memory is provided and accommodated by at least four memory chip locations 50, 54, 56, and 58. In the illustrated embodiment of FIG. 11, chip locations 50, 54 house programmable read only memory, EPROM 1 and 2. Stored within the EPROM 1 and 2 is the data collection program discussed in greater detail below. Location 56 houses a random access memory (RAM) which serves as the primary data storage device. Location 58 houses an electrically erasable or alterable programmable read only memory (EEPROM) which serves as a secondary or back-up memory device in case of a power interruption.

As discussed above, the data collection program is contained within EPROMs 1 and 2 housed at locations 50, 54. The sequence of operation of the data collection program can be described with reference to FIGS. 2–10 which are program flow diagrams of the data collection interrupt program. Starting with FIG. 2, the DCS 40 is switched on and the modem 70, the LCD 46, the real time clock 52, and the devices in the minilab 36 are initialized [A]. After initialization, the DCS 40 remains idle with the LCD 46 displaying the current date, time and revision number of the DCS program along with a ten character message sent from the host system 12.

Figure 2:
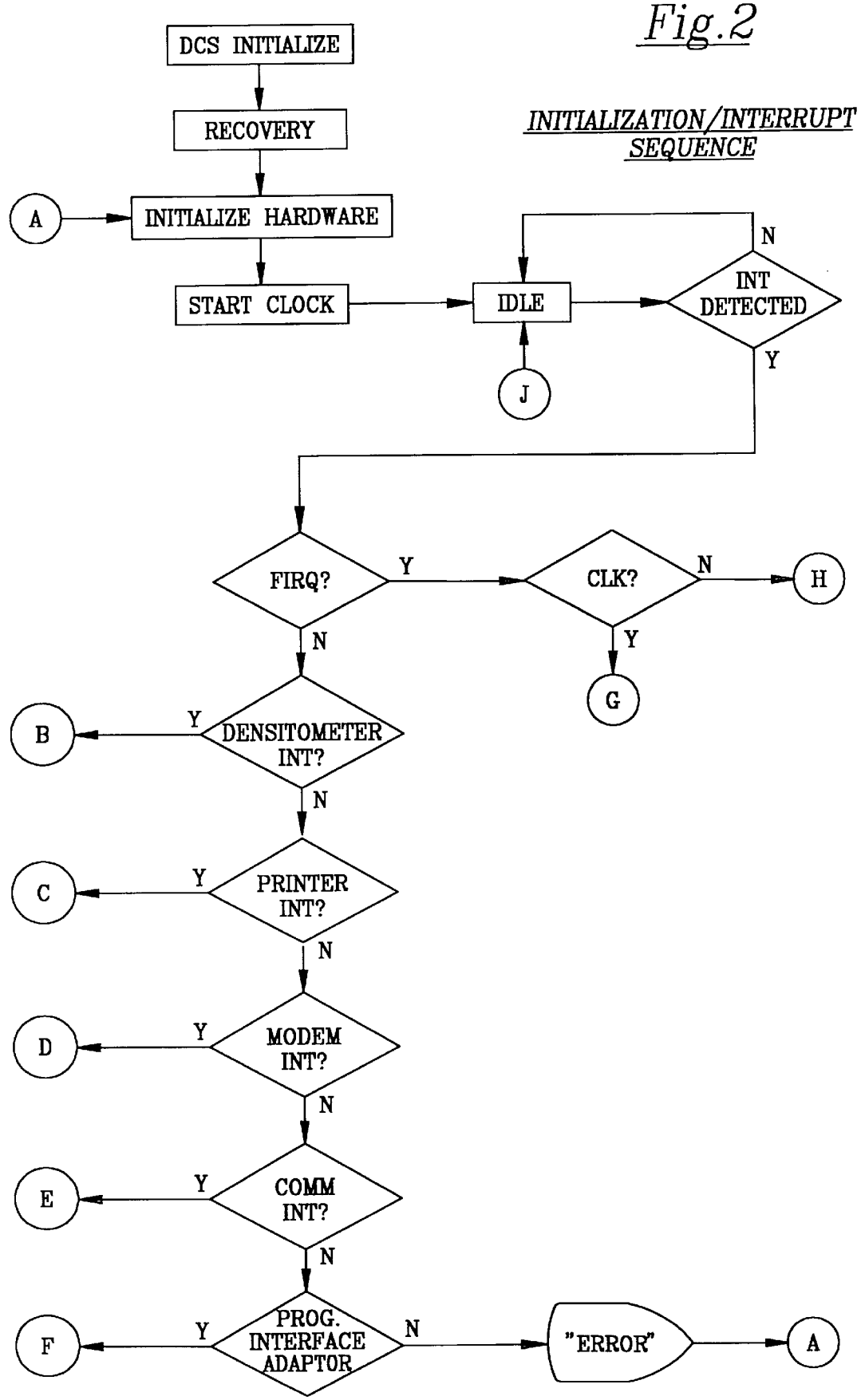
FIG. 2 is a program flow diagram of the data collection apparatus initialization and interrupt sequence.
Figure 9:
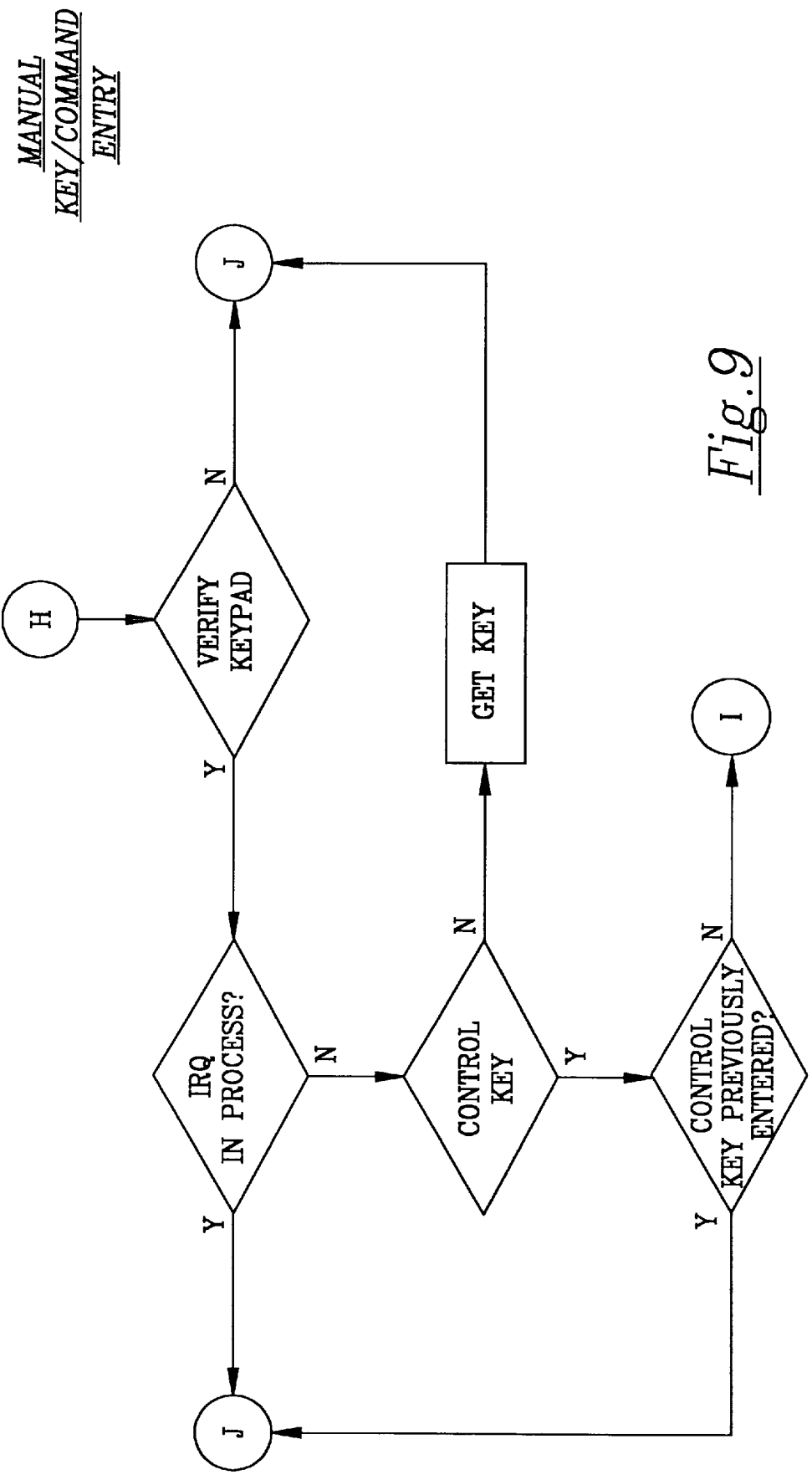
FIG. 9 is a program flow diagram of the key pad sub-program of the data collection apparatus interrupt sequence.
Figure 10:
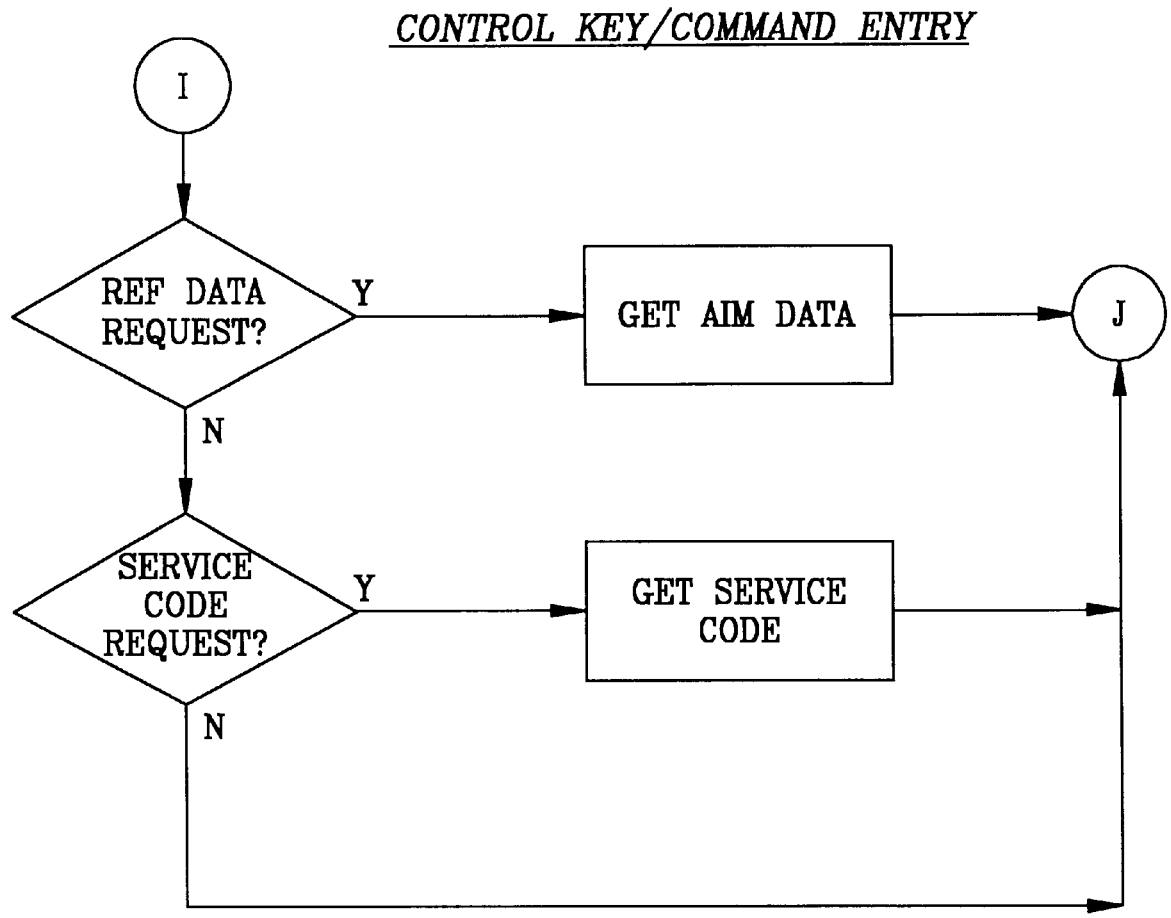
FIG. 10 is a program flow diagram of the control key sub-program of the data collection apparatus interrupt sequence.

As shown in FIG. 2, the DCS 40 will remain in idle condition until interrupted by any of the devices in the photo-minilab 36 or until interrupted by manual activation of keypads 42–45. The interrupts generated by keypads 42–45 and realtime clock 52 are fast interrupt signals [FIRQs] which are given higher priority. The devices in photo-minilab 36 send interrupts [IRQs] which are given lower priority than the FIRQs. FIRQs usually do not lead to the transmission of data and mainly serve to allow entry of control functions, update the time and date, or act as a timer for the processing of other interrupts. Once an interrupt is detected the DCS 40 leaves the idle condition and executes the appropriate interrupt sub-program depending upon the priority of the interrupt and the device which generated it. If one of the keys of key-pads 42–45 is pressed then the sub-program shown in FIGS. 9 and 10 is executed. If a device in minilab 36 generated the signal, then the device sub-programs shown in FIGS. 2–7 are executed.

Figure 8:
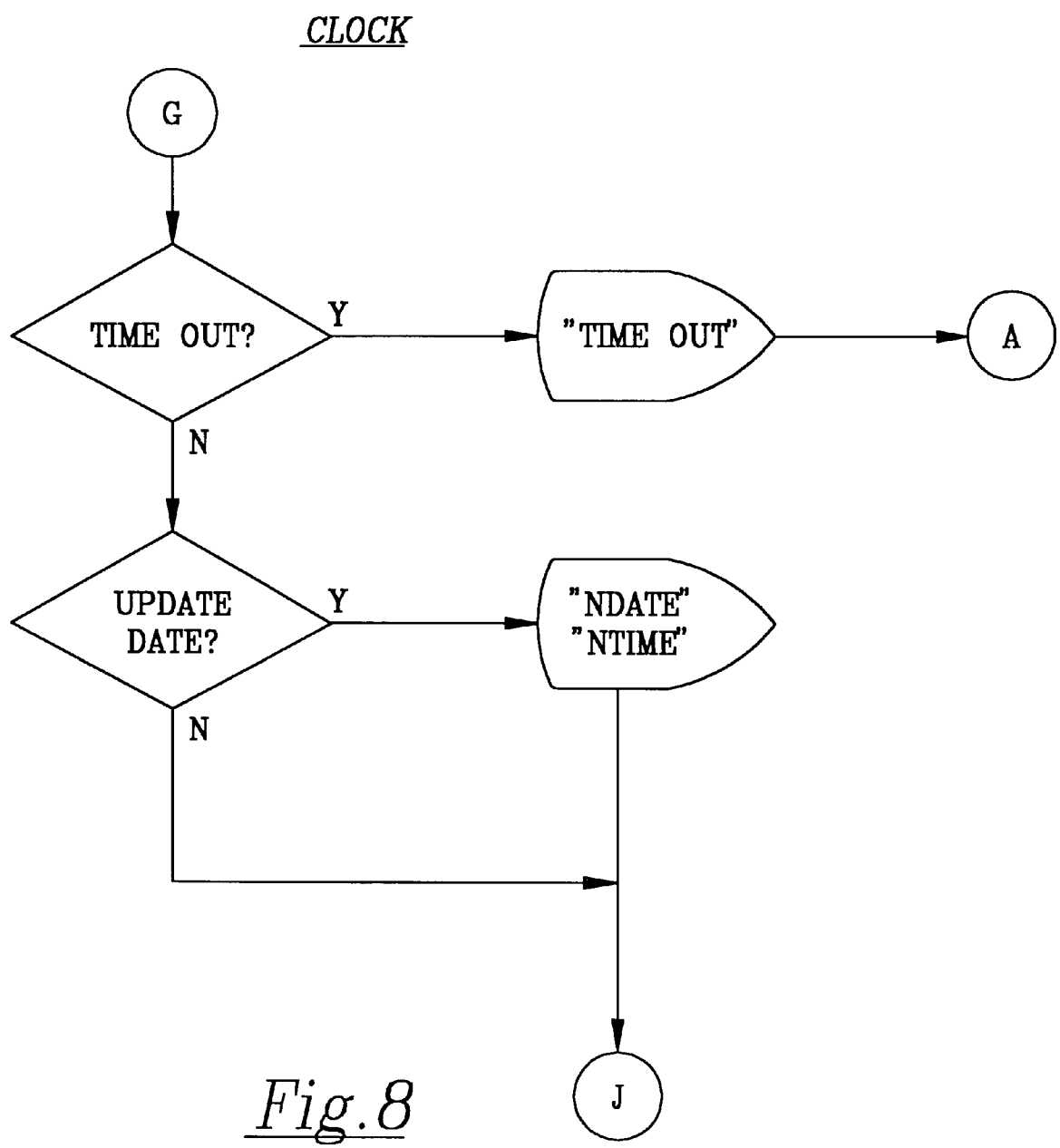
FIG. 8 is a program flow diagram of the clock sub-program of the data collection apparatus interrupt sequence.

The clock sub-program [G] shown in FIG. 8 is used to time out the execution of the device and key pad sub-programs as well as to update the date and time. Moreover, the clock sub-program has the highest priority and will terminate execution of any of the other sub-programs. As shown in FIG. 8, immediately after entering the clock sub-program the time out condition is tested. If the previous sub-program has failed to execute in a specified time then the DCS 40 presumes an error in execution has occurred and an error message is displayed on LCD 46 and the DCS 40 is reinitialized. If the interrupt has not timed out, then the clock sub-program functions to update the date and time. After the update, the new date and time are displayed on the LCD 46 and the DCS 40 is returned to idle [J].

If one of keypads 42–45 is pressed, the keypad sub-program shown in FIG. 9 [H] is executed. The first step is to verify the signal to insure the keypads 42–45 were pressed. If the signal is false, i.e. generated from electromagnetic noise, then the DCS 40 returns to idle [J]. After verifying that the FIRQ signal is from one of the keypads 42–45, a check is made to see if any other interrupt is in progress. If an interrupt is in process, the keypads 42–45 will not halt a previous interrupt and the DCS 40 will return to idle [J] and repeat the above steps until the previous interrupt is no longer executing.

If the keypads 42–45 are used to input non-control commands, then the key value is manually inputted into the DCS 40 and the DCS 40 returns to idle [J]. If a control function is entered, then it must be determined whether any control command has already been entered. If a command was already entered, then the DCS 40 should already be executing the particular control command interrupt and the DCS 40 will not return to idle until the previous control command has completed execution. If a control key is pressed and another key was not previously entered, the system executes the control key sub-program (I).

FIG. 10 illustrates a representative sample of the control key functions which may be entered. The interrupt sequence shown for detecting the selecting and depression of any control key is sequential and, on the occurrence of the detection of any control key, the program can branch to a command sequence corresponding to the control request. An on-site user can request to input reference data and to enter a service message. After the request is executed, the DCS 40 returns to idle [J].

As stated above, the collection of data by the DCS 40 occurs through execution of the device sub-programs which are commenced by interrupts generated by the several devices in the photo-minilab 36. The DCS 40 receives interrupt signals which will indicate that one of the devices in the minilab 36 is ready to transmit data. When a signal is received, the particular device interrupt sub-program will be executed.

Figure 3:
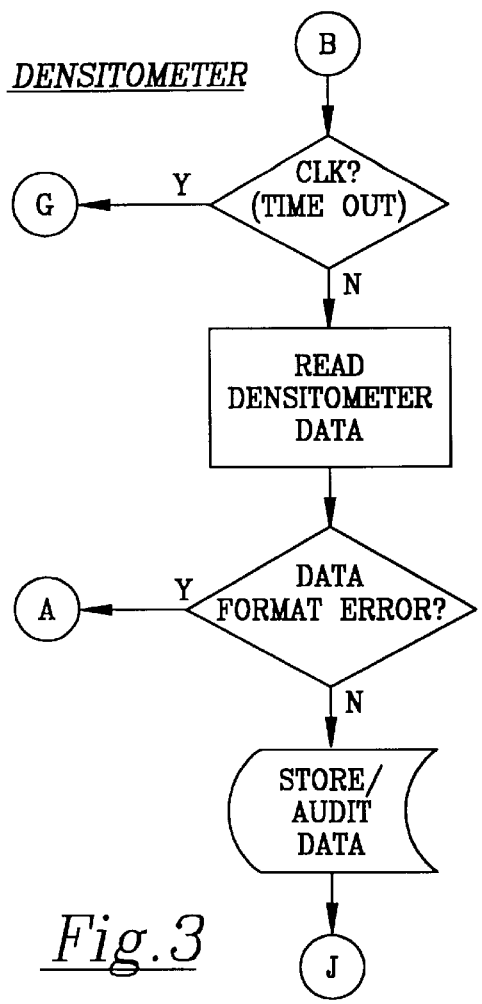
FIG. 3 is a program flow diagram of the densitometer sub-program of the data collection apparatus interrupt sequence.

Referring again to FIG. 2, if the densitometer 32 sends an interrupt signal (B), then the DCS 40 prepares to receive data from the densitometer. As stated above, during each device sub-program, clock 52 can interrupt and halt execution of the device sub-program if it exceeds a predetermined time limit. FIG. 3 illustrates the densitometer interrupt sub-program [B]. After entering the densitometer sub-program, the time-out condition is tested. If the predetermined time has not elapsed, the densitometer 32 transmits its data to the DCS 40 where it is checked to insure that the data is in the proper format and received without error. If the data is not in the proper format, then the DCS 40 is reinitialized [A]. If the data is in proper format, it is stored in both primary memory, RAM 56, and secondary memory, EEPROM 58. If an interrupt request is sent from the printer/processor 34, the DCS 40 prepares to receive data from the printer/processor 34 utilizing the printer sub-program [C]. This sub-program follows the same process as the densitometer sub-program in sending and receiving data as shown in FIG. 4.

Figure 7:
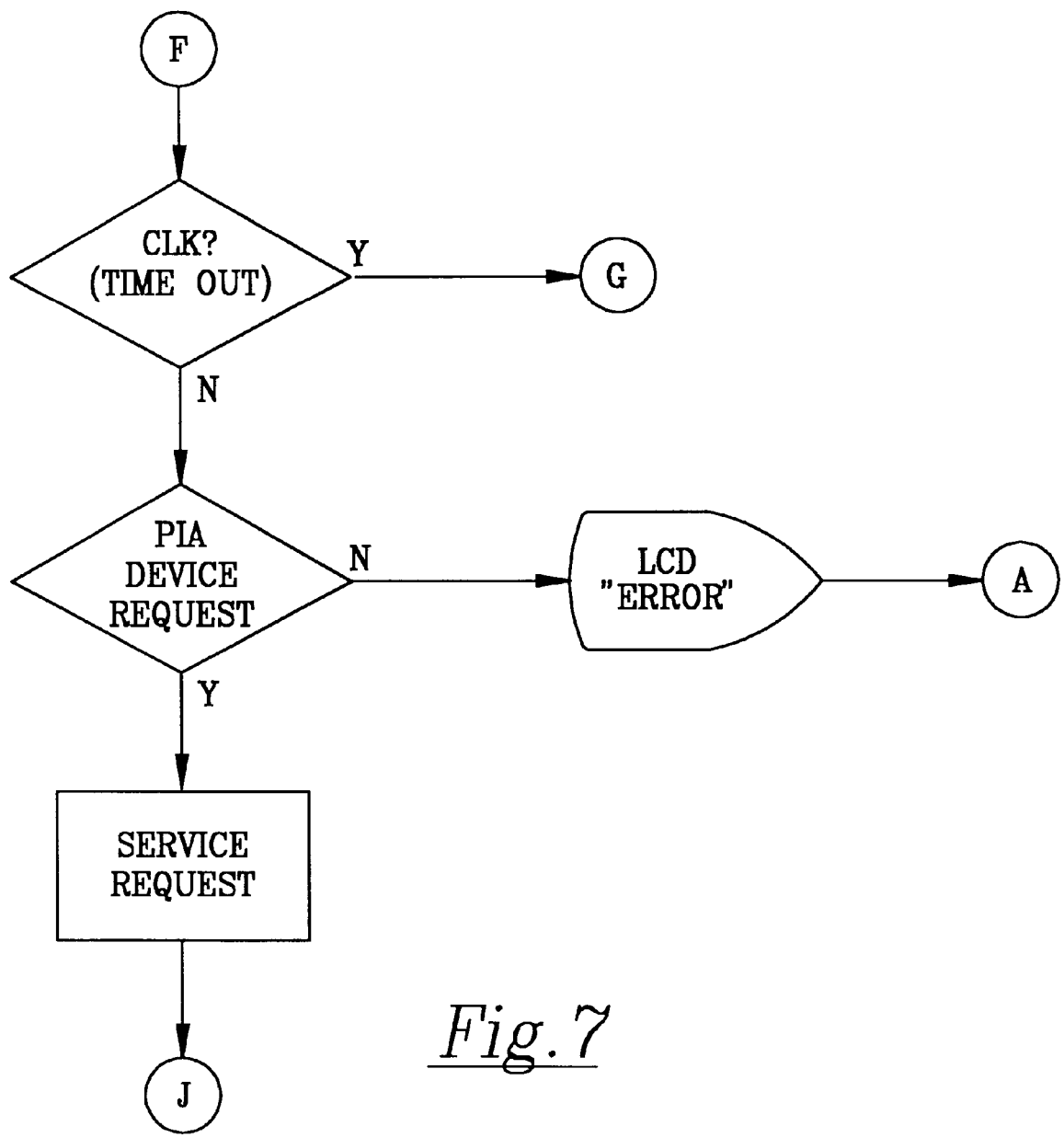
FIG. 7 is a program flow diagram of the programmable interface adapter interrupt sub-program of the data collection apparatus interrupt sequence.

Data may be received from the Programmable Interface Adapter (PIA) 92 and the PIA sub-program shown in FIG. 7 will be executed. Upon entering the PIA sub-program, the time out condition is tested. If the sub-program has timed out, then the DCS reinitializes [A], otherwise the link from the PIA 92 is verified. If the link fails or the request is false or noise, then an error message is printed on the LCD 46 and the DCS 40 reinitializes [A]. Once the link is verified, the request is serviced and the DCS 40 returns to idle [J].

Figure 5:
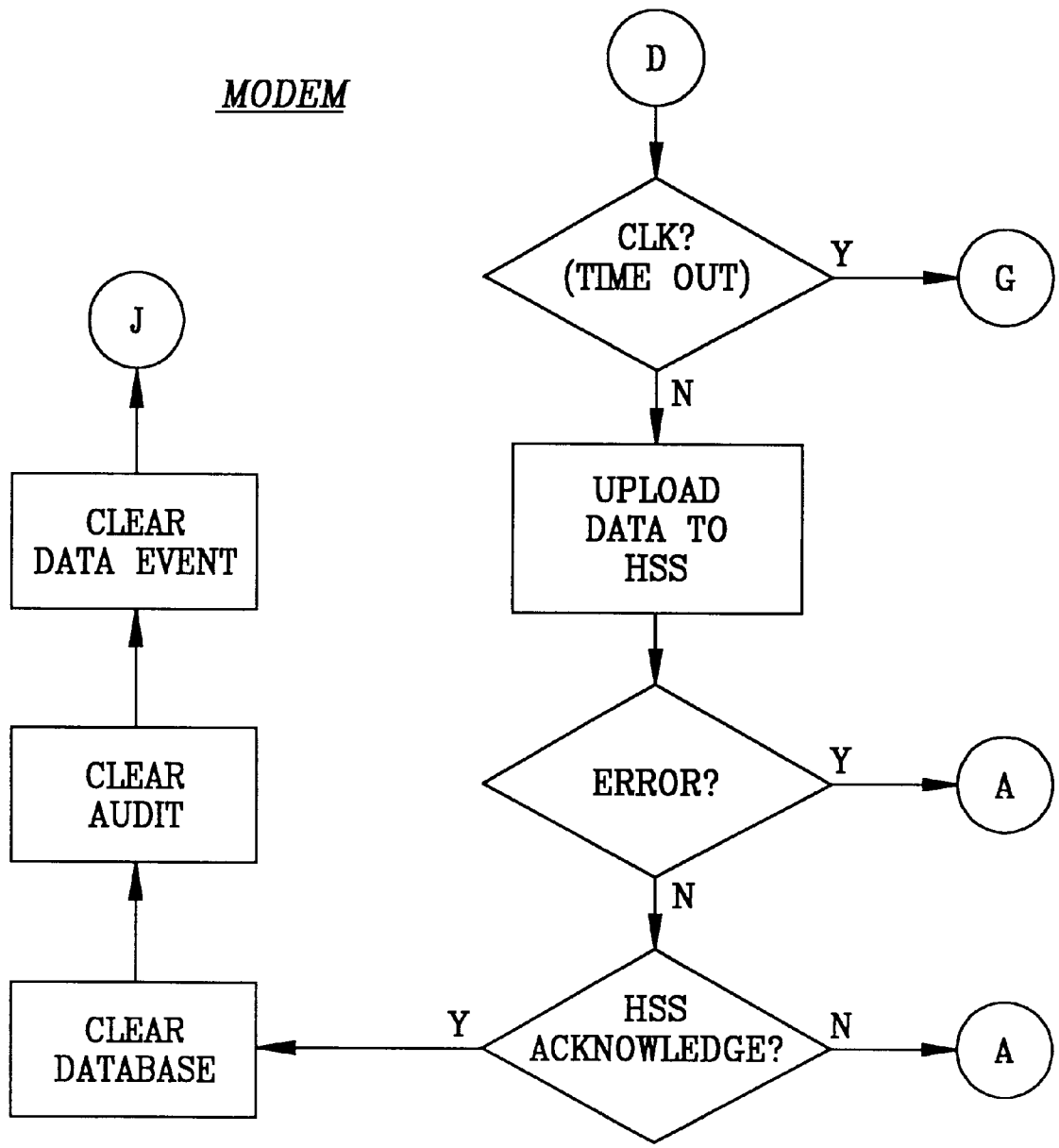
FIG. 5 is a program flow diagram of the modem sub-program of the data collection apparatus interrupt sequence.

If an interrupt signal (D) is received from the modem, this indicates that the host system 12 is ready to download data from the DCS 40. With reference to FIG. 5, before sending the data to the host 12, the DCS 40 checks to insure that the data to be transmitted is in the proper format. If the data is not in the proper format, the DCS 40 is reinitialized (A). If the data is in the proper format, the DCS 40 then requests the host 12 to acknowledge that the data has been received. If the reply from the host 12 is the data is not received, the DCS 40 reinitializes (A). After completion of the downloading of the collected data, the memory in the DCS 40 containing the data and associated registers indicating collection and downloading status are cleared and reset and the DCS 40 is returned to idle [J].

Figure 6:
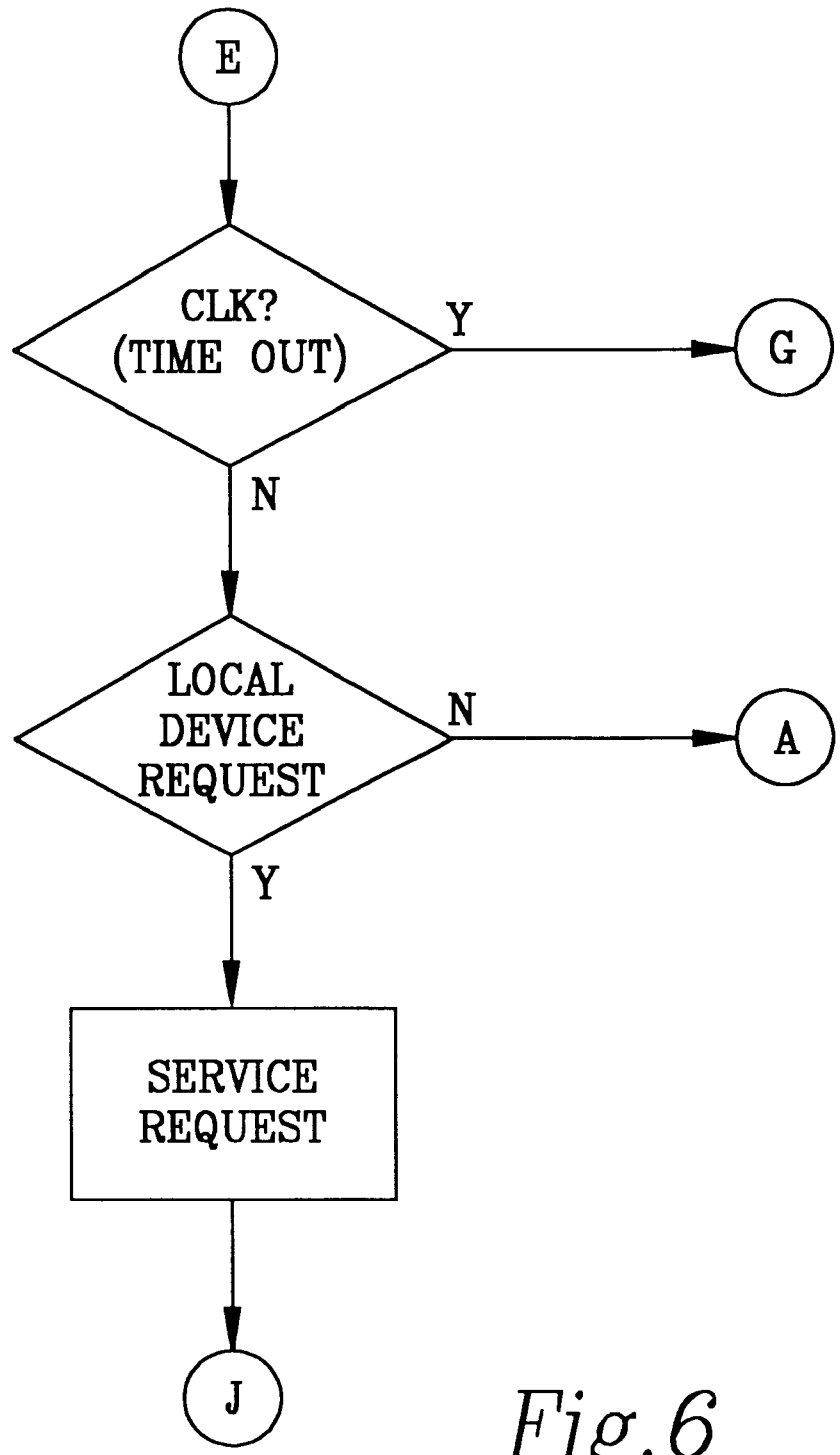
FIG. 6 is a program flow diagram of the local communications port sub-program of the data collection apparatus interrupt sequence.

If an interrupt signal is received from the on site computer 78 or a cash register 80, then the program sequence [E] as shown in FIG. 6 is followed. The local device code is first verified and then the local device is serviced. For example, if the device requesting the interrupt is cash register 80, then the cash register 80 is serviced by downloading information, i.e. point of sale information, to the DCS 40. Upon completion of the local device servicing, the DCS 40 returns to idle [J]. If the device is an on-site computer 78, then the on-site computer 78 can be programmed to access and display data collected and stored by the DCS 40.

As explained above, the DCS 40 is an interrupt driven device. The DCS 40 remains in idle mode until an interrupt [IRQ] is received from any of the densitometer 32, the printer/processor 34, the modem 70, the on-site computer 78, or the computer cash register 80. In addition, interrupt signals of a higher priority (FIRQ) are generated by the key pads 42–45 or the real time clock 52. Certain interrupts are given higher priority than others depending upon the device which generates the interrupt signal.

As the CPU 48 receives an interrupt signal, it determines which device sent the interrupt signal and then relays this data to the device select encoder 60. Device select encoder 60 allows the device which sent the interrupt signal to transmit its data to the selected memory locations, e.g. RAM 56 and EEPROM 58 through data bus 74. Simultaneously, CPU 48 instructs all other devices to stop transmitting data. CPU 48 also sends the device code from which the data is transmitted to the selected memory locations, e.g. RAM 56 and EEPROM 58, via address bus 72 so that the data transmitted is stored either in a location within the memory devices corresponding to the device which sent the data, or the device code is attached to the transmitted data to be stored with it to indicate the source of the data. Each entry in the memory device is also accompanied by a time/date entry to indicate when the data was collected.

Figure 17:
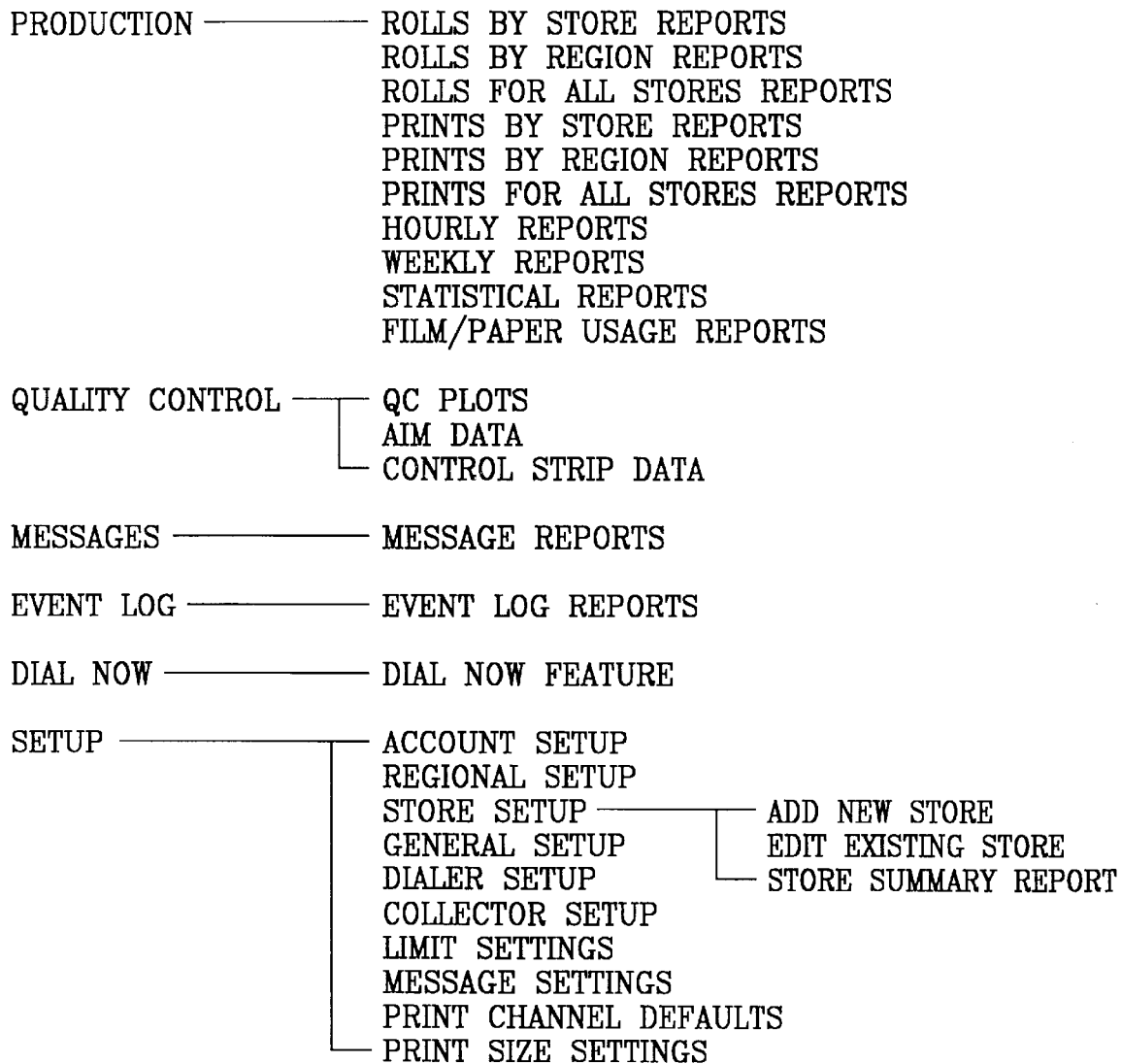

Host system 12 houses the Host System Software [HSS] which is the interface between the user and the data gathered by the DCS devices 40. As can be seen in FIG. 17 the host system 12 is menu driven and operation commences by using a mouse or other pointer device to choose the HSS action identifier wording or icon. Once chosen, the user enters SETUP information based on a SETUP MENU. The SETUP MENU allows the user to identify regions to be monitored and to customize the operation of the HSS. For example, from the SETUP MENU the user can enter account information, regional data, store information and general information. As will be described below, this information is entered into a Setup Database which is comprised of several relational tables as shown in FIG. 17. Once the setup information is entered, the user may access each DCS 40, and download data.

The HSS is a set of software applications which provide the user with all of the necessary tools to retrieve, store, maintain, and report any data received by the DCS 40 collectors. The HSS uses object oriented programming techniques targeted for a Windows type platform. Object oriented programming allows the user to use custom controls which are applications that are distributed with and called from other applications. One object used by the HSS is PDQCOM32.OCX which simplifies the use of serial ports and is used to access the modem which dials the DCS 40. Another object used by the HSS is Data Access Object which is included in Access 2.0 and Visual Basic 4.0. The Data Access Object is used by the DIALer programs, to be described in greater detail below, to place data collected from the various DCS 40 devices into relational databases, also to be described in greater detail below. The relational databases are also created using the Data Access Object.

The data collected from the individual DCS 40 devices are stored in relational databases which are linked together by common fields. In addition to the collected data, the databases also store transactional information which indicates to the user how the information is stored within the database. This method, known as transactional processing, allows large volumes of information to be stored accurately and also allows the data to be more easily recovered in the event of a power failure.

In general, there are three types of relational databases which are categorized by the type of data which is stored within them. The first type stores setup information which is used by the HSS to reference the individual stores allowing the AUTODIAL and DIALNOW programs to access the individual DCS 40 devices. All Setup Tables are contained under the DCSSETUP.MDB filename otherwise known as the Setup Database. Each of the Tables and their relation to other Tables are shown in FIG. 14 and can be described in greater detail as set forth below:

The ACCT INFO TABLE, FIG. 14-1, contains the record of the basic information about a particular account—an identified minilab user. This data is entered by the user in the SETUP MENU—ACCOUNT SETUP which is selected from the MAIN MENU of the HSS as shown in FIG. 17. This Table has a one to many relationship through the REGIONAL INFO TABLE of FIGS. 14, 15.

The DIALNOW TABLE, FIG. 14-2, contains data that is calculated by the HSS application from existing data contained in several other tables. All records in this table are deleted and then replaced by the newest dataset each time the DIALNOW feature is used.

The EVENT LOG TABLE, FIG. 14-3, stores event and error data received from the collectors (DCS 40) and data that is generated from any HSS application that generates an event or an error. Records from this Table can be viewed as Event Log Reports.

The FILE NAMES TABLE, FIG. 14-4, contains the most current list of available production database names and the dates of the first and last orders contained with each database. This list is generated by several HSS applications. The list updates whenever a DIALer application is started, the HSS user interface is launched, or the Data Path in the General Setup Table is changed. This list is used as an index to the appropriate database for any application that is storing or retrieving data in the Production Database.

The FILM CHANNEL DEFAULT TABLE, FIG. 14-5, contains information that represents the default values for film channel information of certain minilab printer/processors 34. This information is entered prior to the installation of the software and does not require user interface.

The FILM CHANNEL TABLE, FIG. 14-6, contains the data necessary to calculate how many orders for a certain store correspond with a particular film size. This data is entered by the user in the SETUP MENU—STORE SETUP, which is selected from the MAIN MENU of the HSS, and is used in creating production information. This Table has a one to one relationship with the PRODUCTION DATA TABLE of FIG. 16-1.

The FILM SIZE LOOKUP TABLE, FIG. 14-7, contains data used to lookup the corresponding film type from the FILM CHANNEL TABLE. The information pertaining to film channel type and length is entered by the user in the SETUP MENU—STORE SETUP, which is selected from the MAIN MENU of the HSS. This Table has a one to one relationship with the FILM CHANNEL TABLE of FIG. 14-6.

The MACHINE LOOKUP TABLE, FIG. 14-8, contains data indicating the model and machine number of photo finishing machinery located at a particular photo-minilab. This data is entered prior to distribution of the software and will be updated in later versions of the software as new photo finishing machines become available. This Table has a relationship with each listed Store in the STORE INFO TABLE of FIG. 14-17.

The MESSAGE LOOKUP TABLE, FIG. 14-9, contains data that is used to display text based messages which are sent to the Host System along with data collected from the DCS 40. This data has default values entered prior to distribution, but the values can be edited in the SETUP MENU—MESSAGE SETTINGS, which is selected from the MAIN MENU of the HSS. This Table has a relationship with the MESSAGE TABLE of FIG. 14-10.

The MESSAGE TABLE, FIG. 14-10, stores message codes along with the store number from which the messages were received. Message coded data is received by the Host System 12 from the DCS 40 and cannot be edited by the user. The messages stored in the Host System 12 which are decoded by using the MESSAGE LOOKUP TABLE.

The PRINT CHANNEL DEFAULT TABLE, FIG. 14-11, contains default information which is used to simplify the entry of Print Channel data in the SETUP MENU—STORE SETUP, which is selected from the MAIN MENU of the HSS. This information allows the user to enter data for like stores by pressing one button and is entered by the user in the SETUP MENU—PRINT CHANNEL DEFAULTS, which is selected from the MAIN MENU of the HSS. This Table has a direct relationship with the PRODUCTION DATA TABLE of FIG. 16-1.

Figures 1, 12:
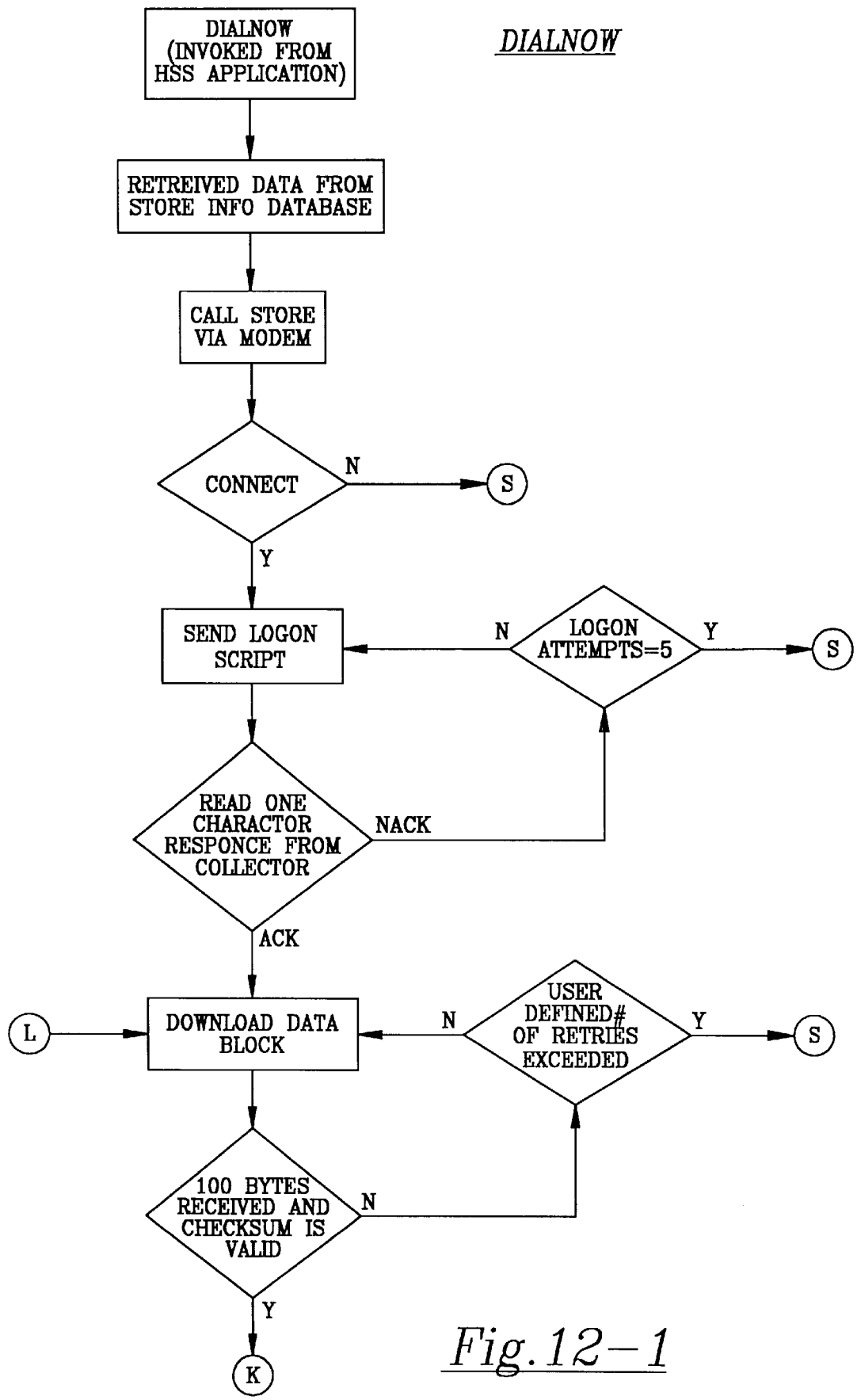
Figures 2, 12:
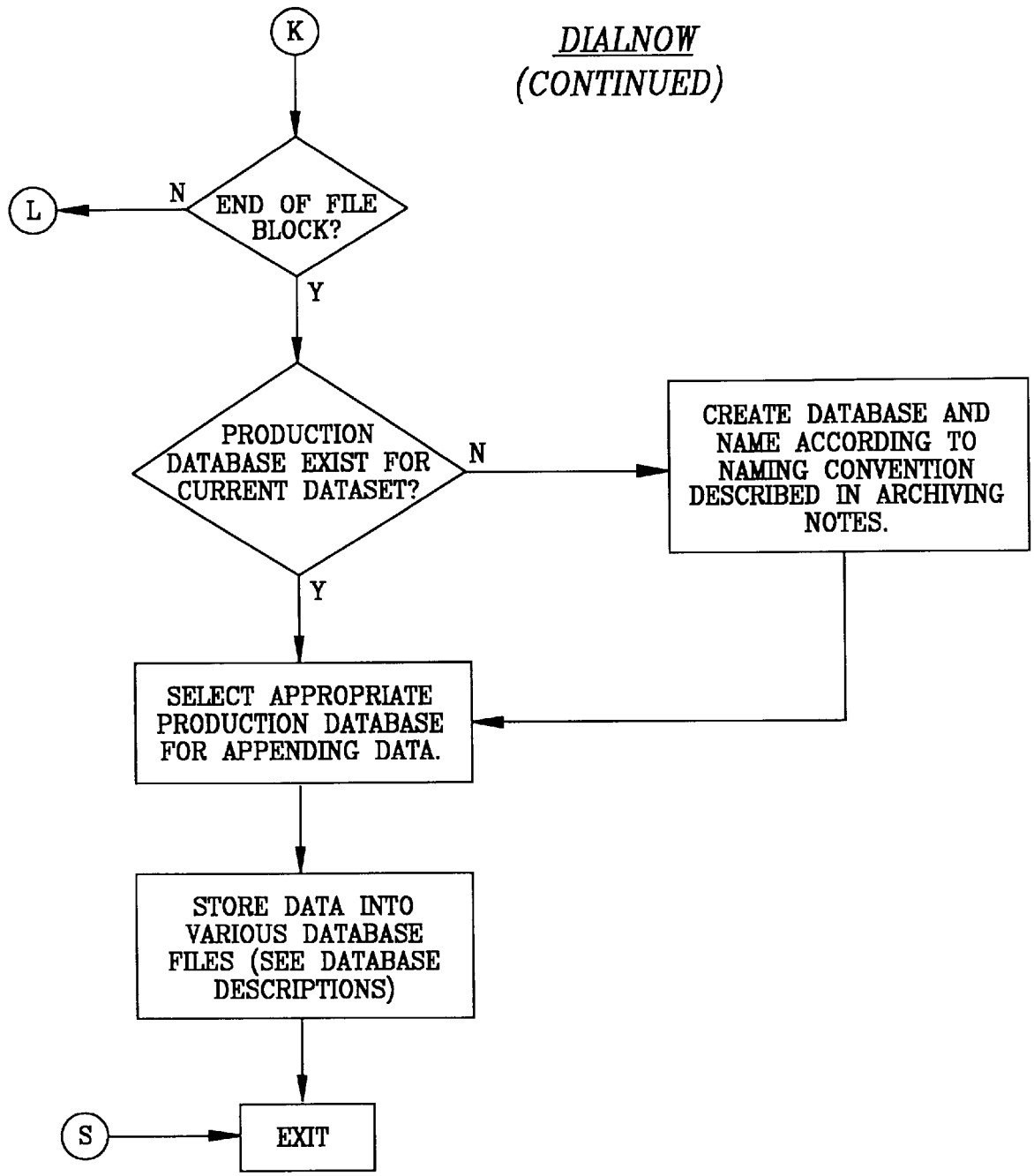

The PRINT CHANNEL TABLE, FIG. 14-12, contains lookup data used to associate a print channel with a specific print size. The information is entered by the user in the SETUP MENU—STORE SETUP, which is selected from the MAIN MENU of the HSS. This Table has a direct relationship with the PRODUCTION DATA TABLE of FIG. 16-1.

Figures 1, 13:
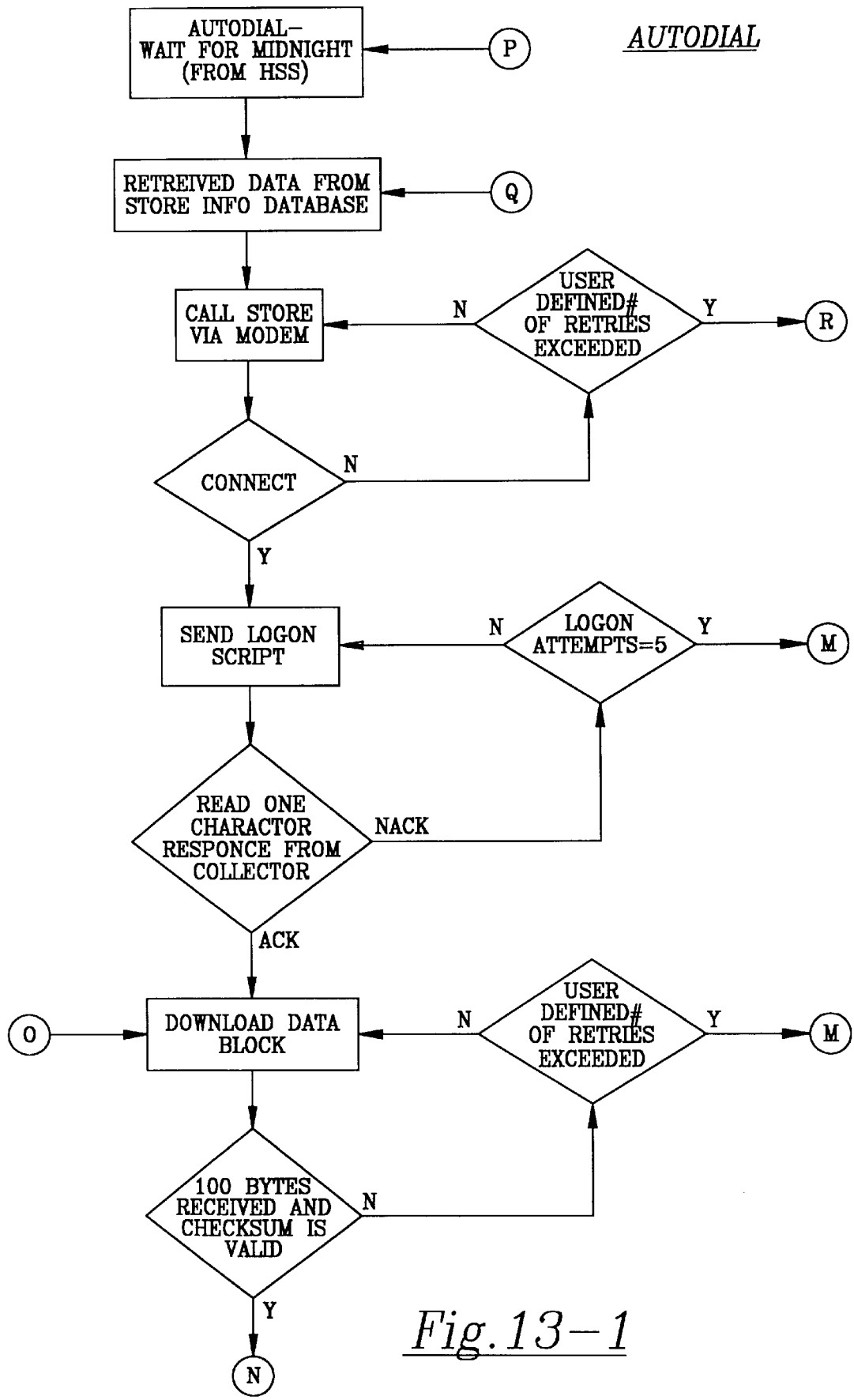
Figures 2, 13:
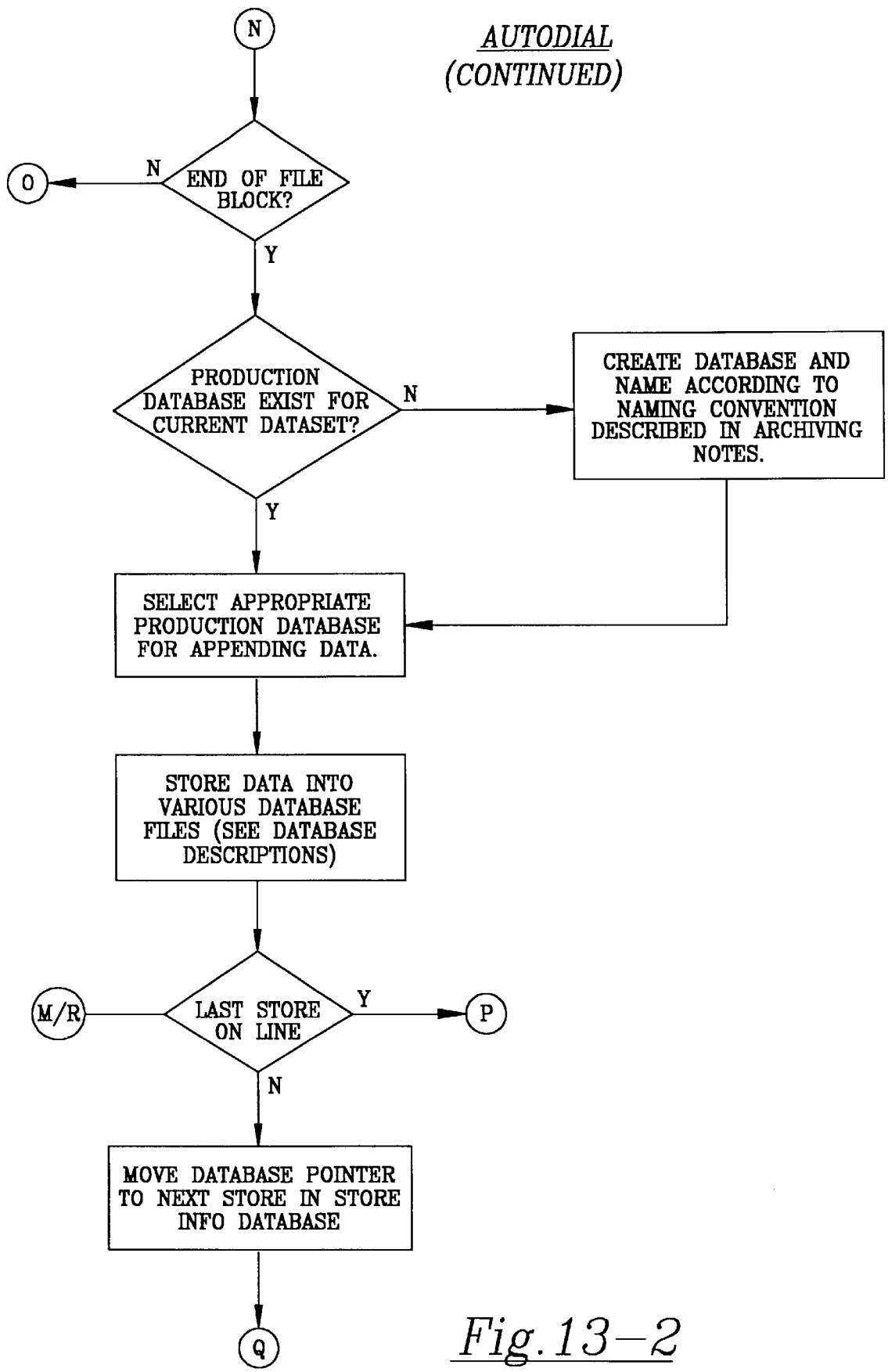

The PRINT SIZE LOOKUP TABLE, FIG. 14-13, contains data used to associate print channel data with a specific print size. This data is entered by the user in the SETUP MENU—STORE SETUP, which is selected from the MAIN MENU of the HSS. This Table is related to data from one or more stores through the PRINT CHANNEL TABLE of FIG. 14-12.

The PROCESS DATA TABLE, FIG. 14-14, contains information used to determine limit settings for each chemical process used in the printer/processor 34. This data has been pre-entered by the developer, but may be edited or appended by the user in the SETUP MENU—LIMIT SETTINGS, which is selected from the MAIN MENU of the HSS.

The REGIONAL INFO TABLE, FIG. 14-15, contains basic information that is used to associate each store with its corresponding region. This data is entered by the user in the SETUP MENU—REGIONAL SETUP, which is selected from the MAIN MENU of the HSS. This Table is related to various data pertaining to stores in the STORE INFO TABLE of FIG. 14-17.

The SETUP TABLE, FIG. 14-16, contains system setup information, such as the date, time, baud rate and other data necessary for proper operation of the modem and the com-port used by the DIALer features. This data is edited by the user in the SETUP MENU—DIALER SETUP, GENERAL SETUP, and COLLECTOR SETUP, which are selected from the MAIN MENU of the HSS.

The STORE INFO TABLE, FIG. 14-17, contains information relating to individual stores, such as the region in which the store is located, the address, phone number and contact, and the production time base and information which is used to calculate parameters in other tables as well as to assist in placing data within the production database and the quality control database. This data is entered by the user in the SETUP MENU—STORE INFO, which is selected from the MAIN MENU of the HSS. This Table is related to the EVENT LOG, MESSAGE, PRINT CHANNEL, FILM CHANNEL, PRODUCTION DATA and AIM DATA TABLEs.

The SUPPORT FILES TABLE, FIG. 14-18, contains a listing of Tables and Database attached by the HSS. This Table is created by the software developer and can not be edited or appended by the user.

The second relational database stores the quality control reference data which allows the HSS to create quality control graphs and reports. The individual data tables are contained under the filename DCSQC.MDB, otherwise known as the Quality Control Database. Each of the Tables shown in FIG. 15 may be described as set forth below.

The AIM DATA TABLE, FIG. 15-1, contains data tabulated through the dialer application of the HSS. The data is tabulated by adding correction factor data and reference strip data from the DCS 40 devices in each store. The data which is stored is kept in this database and is referred to in the photo finishing industry as "Aim Values". These values are used as the starting point for quality control graphs, charts and reports. This Table is related to the REFERENCE STRIP, CORRECTION FACTOR, and CONTROL STRIP DATA TABLEs.

The REFERENCE STRIP DATA TABLE, FIG. 15-2, contains data derived from densitometer 32 which is stored in and received from the individual DCS 40 devices in each of the stores. This data is used in tabulating the data in the AIM DATA TABLE and cannot be edited by the user.

The CONTROL STRIP TABLE, FIG. 15-3, stores the same type data as that in the REFERENCE STRIP DATA TABLE, but may be edited by accessing the QUALITY CONTROL—CONTROL STRIP DATA options from the HSS Menu as shown in FIG. 17.

The CORRECTION FACTOR TABLE, FIG. 15-4, contains data entered by lab personnel into the individual DCS 40 devices in each of the several stores. This data is used to calculate the data in the AIM DATA TABLE and may be edited by accessing the QUALITY CONTROL—AIM DATA options from the HSS menu as shown in FIG. 17.

The third relational database stores the production data which is uploaded from the individual DCS 40 devices in each of the several stores and is known as the Production Database. Unlike the databases containing the Setup and Quality Control information, each PRODUCTION DATA TABLE is an individual database. Each such database is created and contains data according to the time the data was gathered and is named according to a naming convention such that a numeric representation of the data created is used to reference the file. This naming convention for each database file creates a range between the earliest possible day that can be stored through the last day that can be stored in the database. This range is determined by the information registered in Setup Table (FIG. 14-16). The last day is calculated from the Fiscal Year and Months/Days Fields. When the need arises for a new database, the AUTODIAL and DIALNOW features will create it and name it according to the recited convention: YR/MTH/DAY.MDB, i.e. 19960601.MDB. The Production Database structure is illustrated in FIG. 16 and can be described as follows.

The PRODUCTION DATA TABLE, FIG. 16, contains the relevant production data uploaded from the DCS 40 which is collected from the densitometer 32, printer/processor 34, control keys, and optional pricing unit 66. This table is designed to store production data from a conventional film system. If an APS film system is being utilized, the PRODUCTION DATA TABLE (APS), FIG. 4A, represents the data format of one type of printer/processor 34 which is able to derive and communicate APS data. The particular data format depends upon the manufacturer of the printer/processors 34. In each case, the format of the uploaded data will be different. The DCS 40 setup is customized to correspond with each make and model of the printer/processor 34 by making the appropriate machine number section in the Setup Menu of the Host System Software shown in FIG. 17.

The DCS 40 can be accessed from the host system 12 and requested to upload its data. The HSS has two features which allow the host system 12 to access DCS 40 on demand or at a preset time. The DIALNOW feature allows a user to access the data stored in the DCS 40 of an individual store on demand and will be described with reference to FIGS. 12-1 and 12-2. DIALNOW is invoked from the host system 12 and connects to the photo-minilab 36 via modem 20 along communication path 30. If modem 70 in DCS 40 does not respond, then modem 20 will retry to establish contact.

Once contact is established a logon script is entered which contains the date and time, the old password, the new password, a ten byte message for display on LCD 46, and a machine code according to the type of printer/processor 34 connected to the DCS 40. In addition, a checksum byte is entered to insure that the data which will be downloaded has all been transmitted. The DCS 40 then verifies the password information. If the password information is not correct, then the user is allowed a defined number of retry attempts to logon before being locked out of the access routine.

Once access is obtained, data is verified and uploaded to the host system 12. The data is verified using the checksum byte to insure that all data has been transmitted. If the data is not in proper format, then a number of attempts, predefined by the user in the Setup Menu of the HSS, are made to verify the data. If the data is still not in proper format, then, after a finite number of attempts to access the data, the upload is terminated and DCS 40 returns to Idle [J] and must be re-accessed. As shown in FIG. 12-2, a determination is made whether all the data has been transmitted from the DCS 40, i.e. if the EOF Block has been received. If there are no other blocks of data to be received, then the current data block is uploaded to the host system 12 where it is stored into pre-determined database files.

Once the data has been uploaded to the host system 12 a determination is made whether a database already is in existence for the particular production data. As described above, the data transmitted from the DCS 40 contains a date and time stamp for each Production Database which corresponds to a new archival period as defined in Setup Menu. Therefore, if the data uploaded from the DCS 40 begins a new day, then a new Production Database is created according to the naming convention described above.

After all the data is uploaded from the DCS 40 and the appropriate Production Databases created, the data is then categorized according to production and quality control data and placed in the appropriate Production Database and the appropriate tables within the Quality Control Database. For example, production data is placed in the Production Data Table. After all the data from a particular store has been placed in the tables within the databases, the DIALNOW feature is exited and the user must re-invoke DIALNOW in order to access another store.

The AUTODIAL routine allows each photo-minilab store to be accessed at a preset time and will be described with reference to FIGS. 13-1 and 13-2. The HSS Setup Menu allows the user to enter a preset time when the AUTODIAL routine will call each of the photo minilabs 36 and upload collected data from the several stores. When the pre-set time arrives, the host system 12 calls a particular DCS 40 device via modem 20. If a connection can not be established, the host system 12 will repeat the attempt to connect to the selected DCS 40 device a defined number of times, as defined by the user in the Setup Menu. If the pre-set number of retry attempts is exceeded, the AUTODIAL routine checks to see if the current store is last to be accessed and, if not, attempts to contact the next DCS 40 device which is listed in the STORE INFORMATION TABLE.

Once contact is established using the AUTODIAL routine, a logon script is entered which contains the date and time, the old password, the new password, a ten byte message for display on LCD 46, and a machine code according to the type of printer/processor 34 connected to the DCS 40. In addition, a checksum byte is entered to insure that the data which will be uploaded has all been transmitted. The DCS 40 verifies the password information and, if the password information is not correct, the host system 12 is allowed a defined number of retry attempts to logon before failure is determined and in attempt to access the next store listed in the STORE INFORMATION TABLE.

Once access is obtained, data is verified and uploaded to the host system 12. The data is verified using the checksum byte to insure that it has all been transmitted. If all the data has not been transmitted, then a number of attempts, pre-defined by the user in the Setup Menu of the HSS, are made to re-transmit the data. If the data can not be transmitted, then the host system 12 will re-attempt, a number of times defined by the user, to upload the data. The upload is terminated once the host system 12 receives the EOF Block or if the retry attempts are exceeded.

Once the data has been uploaded to the host system 12 the same procedure for creating Production Databases and storing the uploaded data in the appropriate tables and databases as was followed in the DIALER routine is followed. The only difference is that after the data has been stored in the appropriate tables and databases, the AUTODIAL routine checks to see if all the DCS 40 devices listed in the STORE INFORMATION TABLE have been accessed. If they have all been accessed the AUTODIAL routine terminates until the next pre-determined time for accessing the DCS 40 devices has been reached. Otherwise the database pointer is moved to the next DCS 40 device of the same or successive store and the AUTODIAL routine is repeated until data from all stores has been accessed and uploaded to the host system 12.

The user can access the data stored in the host system 12 by viewing the data on the VDT 22 or printing out a variety of charts, graphs or tables created by the host system 12. This is accomplished by selecting from the Production Menu as shown in FIG. 17. The Main Menu allows the user to obtain Quality Control Reports, Production Reports, Message Reports and Event Log Reports. Each of these reports is created using the corresponding data tables. For example, the Production Reports will be generated using the data stored in the Production Databases shown in FIG. 16 along with any necessary setup data stored in the Setup Database shown in FIG. 14.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A photographic processing data collection apparatus which receives and stores data collected from a group of devices in proximity to said data collection apparatus comprising:

an on-site data collector integral with a photographic processor for receiving and storing photographic processing data;

a host computer located at a distant location which contains a means for receiving and formatting data which is downloaded from said on-site data collector to be stored in relational databases;

a bidirectional communication path interconnecting said host computer and said on-site data collector.

2. The apparatus according to claim 1, wherein said on-site data collection further comprising;

a real time clock;

at least three serial interface ports for communicating with local peripheral devices;

a keypad allowing for the manual entry of data signals;

a device for displaying messages and the status of said data collector;

at least one parallel interface port;

at least one programmable interface apparatus; and a plurality of alterable memory devices for accepting commands and device and data parameters from said host computer, manual entry of commands and temporary storage of said collected photographic processing data.

3. The apparatus according to claim 1, wherein said on-site data collector further comprising:

at least two random access memory chip locations with one of said at least two random access memory chip locations being used for an electrically erasable programmable read only memory; and at least two erasable programmable read only memory chip locations.

4. The apparatus according to claim 1, wherein said communication path between said data collector and said host computer being through a paired set of modems and a common telecommunication line.

5. A data collector integral with a photographic processor which receives and stores photographic processing data collected from a group of devices in proximity to said data collector comprising:

a central processing unit for controlling the operation of said data collector;

at least one serial interface;

at least one parallel interface;

at least one programmable interface apparatus;

a means located on said data collector for the manual entry of data and commands;

a real time clock for generating a time/date stamp;

a display for providing visual indications of data collector status and reviewing command or data entry; and a plurality of alterable memory devices for accepting commands and device and data parameters from said host computer, manual entry of commands and temporary storage of said collected photographic processing data.

6. The data collector according to claim 5, wherein said at least one serial interface communicates with at least one from a group of devices, said group consisting of a computerized cash register, a densitometer and a printer/processor.

7. The data collector according to claim 5, wherein said at least one parallel interface communicates with at least one of a group of devices, said group consisting of a computerized cash register, a densitometer and a printer/processor.

8. A data collector integral with a photographic processor which receives and stores photographic processing data comprising:

a central processing unit for controlling the operation of said data collector;

at least one serial interface for communicating with a device located in proximity to said data collector, said device being one from a group consisting of a computerized cash register, a densitometer and a printer/processor;

at least one parallel interface for communicating with a device located in proximity to said data collector, said device being one from a group consisting of a computerized cash register, a densitometer and a printer/processor;

at least one programmable interface apparatus for communicating with a pricing unit;

a keypad allowing for the manual entry of data and commands;

a real time clock for generating a time/date stamp;

a display for providing visual means indicating data collector status and reviewing command or data entry;

a plurality of alterable memory devices for accepting commands and device and data Parameters from a host computer, manual entry of commands and temporary storage of said collected photographic processing data for subsequent transmission to said host computer for storing and reformatting said data for later selective retrieval in the form of one or more reports.

9. A data collection apparatus which receives and stores photographic processing data collected from a group of devices in proximity to said data collector and transmits said collected data to a distant location comprising:

a central processing unit for controlling the operation of said data collector;

at least one serial interface;

at least one parallel interface;

a keypad allowing for the manual entry of data and commands;

a real time clock for generating a time/date stamp;

a display for providing visual means indicating data collector status and reviewing command or data entry;

a plurality of alterable memory devices for temporary storage of commands and device and data parameters and said collected data;

a host computer located at said distant location which utilizes a communication path to download commands and device and data parameters to said data collector and upload collected data from said data collector to said host computer system for formatting and storing said collected and transmitted data into relational databases.

10. A plurality of data collectors integral with photographic processors located in diverse and distant locations each of which receives and stores photographic processing data collected from a group of devices in proximity to each of said plurality of data collectors and transmits said collected photographic processing data to a distant host computer system, each data collector comprising a central processing unit for controlling the operation of said data collector, at least one serial interface, at least one parallel interface, at least one programmable interface apparatus, a data entry means for the manual entry of data and commands, a real time clock for generating a time/date stamp, a display for providing visual indications of data collector status and reviewing command or data entry, a plurality of alterable memory devices for temporary storage of commands and device and data parameters and said collected data, said host computer system utilizes a communication path to download commands and device and data parameters to said plurality of data collectors and upload collected data from said plurality of data collectors and formats and stores said collected and transmitted data into relational databases for later selective retrieval of said photographic processing data in the form of one or more visually perceptive reports.

11. A method for the remote collection of photographic processing data compiled at a photo-minilab comprising the steps of:

collecting and storing photographic processing data from a group of devices consisting of a real time clock, a densitometer, a key pad, and a printer/processor which are all located at said photo-minilab by utilizing an on-site data collection apparatus having at least one alterable memory device;

establishing contact between the on-site data collection apparatus and a host computer located at a distant location by utilizing a communication path;

downloading commands and device and data parameters to said data collector from said host computer and uploading collected data from said on-site data collection apparatus to said host computer; and formatting and storing said data into one or more relational databases which allows for the selective retrieving of said data in reports on request by a user.

12. The method for the collection of photographic processing data compiled at a photo-minilab of claim 11, further comprising the steps of:

initializing an on-site data collection apparatus by entering the current date and time;

retrieving said photographic processing data from the one or more of said devices which generated an interrupt signal; and storing said photographic processing data into random access memory and a secondary electronically erasable programmable read only memory for transmission to said distant host computer.

13. The method for collection of photographic processing data compiled at a photo-minilab of claim 11, further comprising the step of communicating, by downloading over a communication path, commands and device and data parameters from a host computer, and by uploading over said communication path, said photographic processing data to said distant host computer on demand.

14. The method for the collection of photographic processor data compiled at a photo-minilab of claim 11, further comprising the step of communicating, by downloading over a communication path, commands and device and data parameters from a host computer, and by uploading over said communication path, said photographic processing data to said distant host computer by said host computer polling said data collector apparatus at a pre-determined time.

\* \* \* \* \*